United States Patent [19]

Inagaki et al.

[11] Patent Number: 5,464,734

[45] Date of Patent: Nov. 7, 1995

[54] METHINE COMPOUNDS AND SILVER HALIDE PHOTOGRAPHIC MATERIALS CONTAINING THE COMPOUND

[75] Inventors: Yoshio Inagaki; Shuzo Suga, both of Kanagawa, Japan

[73] Assignee: Fuji Photo Film Co., Ltd., Kanagawa, Japan

[21] Appl. No.: 257,051

[22] Filed: Jun. 8, 1994

[30] Foreign Application Priority Data

Jun. 8, 1993 [JP] Japan .................................. 5-137462

[51] Int. Cl.$^6$ .............................. G03C 1/12; G03C 1/815
[52] U.S. Cl. ........................ 430/570; 430/576; 430/577; 430/578; 430/584; 430/585; 430/510; 430/513
[58] Field of Search ................................ 430/570, 576, 430/577, 578–595, 510, 513

[56] References Cited

U.S. PATENT DOCUMENTS

| | | | |
|---|---|---|---|
| 3,705,038 | 12/1972 | Phillipaerts . | |
| 5,290,676 | 3/1994 | Nagaoka et al. | 430/583 |
| 5,308,748 | 5/1994 | Ikegawa et al. | 430/584 |
| 5,338,656 | 8/1994 | Ikegawa et al. | 430/584 |

*Primary Examiner*—Thorl Chea
*Attorney, Agent, or Firm*—Sughrue, Mion, Zinn, Macpeak & Seas

[57] ABSTRACT

Disclosed is a silver halide photographic material containing a compound of formula (1) or (2):

$$(DYE)\text{---}(G)_n \quad (1)$$

$$(DYE)\text{---}(G^-)_n \quad (2)$$

where DYE represents a methine dye residue; G and G$^-$ each represent a substituent for the methine dye residue, and are represented by formulae (3) and (4), respectively; and n represents an integer of from 1 to 6.

$$\text{---}T^1\text{---}G^1NHG^2 \quad (3)$$

$$\text{---}T^1\text{---}G^1N^-G^2 \quad (4)$$

where T$^1$ represents a divalent linking group; G$^1$ represents a carbonyl group, a sulfinyl group, or a sulfonyl group; G$^2$ represents —CO—T$^2$—, —SO—T$^2$, —SO$_2$—T$^2$, or a cyano group; and T$^2$ represents a monovalent group. The spectral sensitivity of the material is high, and the material has few residual color after processed.

5 Claims, No Drawings

METHINE COMPOUNDS AND SILVER HALIDE PHOTOGRAPHIC MATERIALS CONTAINING THE COMPOUND

FIELD OF THE INVENTION

The present invention relates to methine compounds and silver halide photographic materials containing the compound.

BACKGROUND OF THE INVENTION

Recently, rapid processing of silver halide photographic materials to form photographic images is desired. However, rapid processing is often unfavorable to photographic materials. When photographic materials are processed rapidly, it becomes impossible to ensure a sufficient time necessary for decoloring the dyes or the sensitizing or desensitizing dyes contained in the photographic materials or for removing them from the materials, with the result that the processed photographic materials have noticeable residual color resulting from the dyes or sensitizing or desensitizing dyes remained therein.

Heretofore, various improvements have been made for overcoming the problem. For instance, it has been proposed to use water-soluble dyes or to improve processing solutions to be used, so as to elevate the decoloring rate. Various methods are known for reducing residual color in processed photographic materials. For instance, there are described (1) a method of adding a water-soluble stilbene compound, a nonionic surfactant or a mixture of them to a developer, (2) a method of treating the photographic element that has been bleached and fixed with an oxidizing agent so as to decompose the dyes in the element, and (3) a method of using a bleaching bath containing persulfuric acid, in Research Disclosure, Vol. 207, No. 20733 (July, 1981). However, these methods are insufficient when the degree of residual color is great. In addition, since these methods could not positively promote the step of decoloring and removing sensitizing dyes, they are not suitable for decoloration of the dyes in rapid processing.

SUMMARY OF THE INVENTION

One subject matter of the present invention is to provide novel methine compounds.

Another subject matter of the present invention is to provide silver halide photographic materials which may be processed to have less residual color, while having satisfactory photographic properties such as sensitivity.

These subject matters of the present invention have been attained by a silver halide photographic material containing at least one of the compounds of the following formulae (1) and (2):

  (1)

  (2)

where DYE represents a methine dye residue; G and G⁻ each represent a substituent for the methine dye residue, G represents a group of formula (3); G⁻ represents a group of formula (4); and n represents an integer of from 1 to 6.

  (3)

  (4)

in which $T^1$ represents a divalent linking group; $G^1$ represents a carbonyl group (—CO—), a sulfinyl group (—SO—), or a sulfonyl group (—SO$_2$—); $G^2$ represents —CO—$T^2$, —SO—$T^2$, —SO$_2$—$T^2$, or a cyano group (—CN); and $T^2$ represents a monovalent group.

They have also been attained by compounds of the above-mentioned formula (2).

As one preferred embodiment of the present Invention, the silver halide photographic material contains at least one of the compounds of formulae (1) and (2) along with a dispersion of fine solid grains of a dye(s).

DETAILED DESCRIPTION OF THE INVENTION

In formula (1) or (2), DYE represents a residue of a methine dye. As the structure of the methine dye, typically mentioned are polynuclear methine dyes such as cyanine dyes, merocyanine dyes and rhodacyanine dyes, as well as photographic sensitizing dyes, photographic desensitizing dyes and other poorly-sensitizing photographic dyes that are used for absorbing unnecessary light, such as oxonole dyes, styryl dyes, benzylidene dyes, and arylidene dyes.

The methine dye residue represented by DYE may have a cation capable of neutralizing the charge in the molecule. Examples of such a cation include alkali metal ions (e.g., sodium ion, potassium ion), a optionally substututed ammonium ion (e.g., ammonium ion, triethylammonium ion, tetrabutyl ammonium ion, pyridinum ion, N-ethylpyridium ion), and a heterocyclic onium ion forming a cyanine dye. The cation may form an intramolecular salt in the form of the partial structure of DYE.

DYE is preferably a cyanine series or merocyanine series, particularly a cyanine series.

The methine compound of formula (2) is most preferred in the present invention.

As preferred examples of the dye structures to be represented by DYE, mentioned are dyes of the following formulae (5) to (7). Namely, the compounds of the present invention have a substituent(s) of formula (3) or (4) in the dye structure represented by formula (5), (6) or (7):

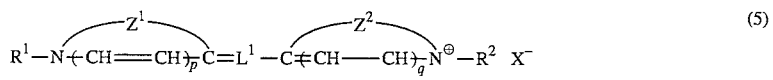  (5)

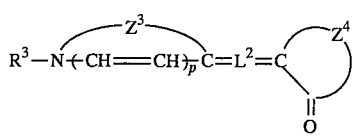 (6)

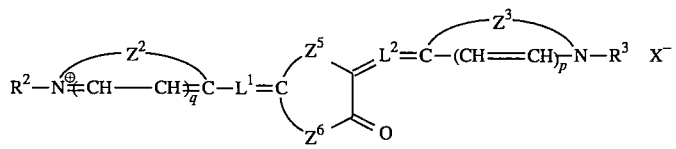 (7)

In these formulae, $Z^1$ and $Z^2$ each represent an atomic group for forming a 5-membered or 6-membered nitrogen-containing hetero-ring along with (N—(CH=CH)$_p$—C) or (C=(CH—CH)$_q$=N$^+$), respectively, in the formula. Examples of the hetero-ring are mentioned below, which, however, are referred to as their non-ionic forms but not as their quaternary salt forms for convenience sake.

Thiazole nuclei (e.g., thiazole, 4-methylthiazole, 4-phenylthiazole, 4,5-dimethylthiazole, 4,5-diphenylthiazole); benzothiazole nuclei (e.g., benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylthiobenzothiazole, 5,6-dimethylbenzothiazole, 5-hydroxy- 6-methylbenzothiazole, tetrahydrobenzothiazole, 4-phenylbenzothiazole); naphthothiazole nuclei (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d] thiazole, 8-methylthionaphtho[1,2-d]thiazole, 5-methoxynaphtho[2,3-d]thiazole); thiazoline nuclei (e.g., thiazoline, 4-methylthiazoline, 4-nitrothiazoline); oxazole nuclei (e.g., oxazole, 4-methyloxazole, 4-nitrooxazole, 5-methyloxazole, 4-phenyloxazole, 4,5-diphenyloxazole, 4-ethyloxazole), benzoxazole nuclei (e.g., benzoxazole, 5-chlorobenzoxazole, 5-methylbenzoxazole, 5-bromobenzoxazole, 5-fluorobenzoxazole, 5-phenylbenzoxazole, 5methoxybenzoxazole, 5-nitrobenzoxazole, 5-trifuoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6dimethylbenzoxazole, 4,6-dimethylbenzoxazole, 5-ethoxybenzoxazole); naphthoxazole nuclei (e.g., naphtho[2,1-d]oxazole, naphtho [1,2-d]oxazole, naphtho [2,3-d] oxazole, 5-nitronaphtho[2,1-d]oxazole); oxazoline nuclei (e.g., 4,4-dimethyloxazoline); selenazole nuclei (e.g., 4-methylselenazole, 4-nitroselenazole, 4-phenylselenazole); benzoselenazole nuclei (e.g., benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole); naphthoselenazole nuclei (e.g., naphtho[2,1-d]selenazole, naphtho[1,2-d]selenazole); 3,3-dialkylindolenine nuclei (e.g., 3,3-dimethylindolenine, 3,3-diethylindolenine, 3,3-dimethyl- 5-cyanoindolenine, 3,3-dimethyl-6-nitroindolenine, 3,3-dimethyl-5-nitroindolenine, 3,3-dimethyl- 5-methoxyindolenine, 3,3,5-trimethylindolenine, 3,3-dimethyl-5-chloroindolenine); imidazole nuclei (e.g., 1-alkylimidazole, 1-alkyl-4-phenylimidazole, 1-alkylbenzimidazole, 1-alkyl-5-chlorobenzimidaozle, 1-alkyl-5,6-dichlorobenzimidazole, 1-alkyl-5-methoxybenzimidazole, 1-alkyl-5-cyanobenzimidaozle, 1-alkyl- 5-fluorobenzimidazole, 1-alkyl-5-trifluoromehtylbenzimidazole, 1-alkyl-6-chloro-5-cyanobenzimidazole, 1-alkyl-6-chloro-5-trifluoromethylbenzimidaozle, 1-alkylnaphtho[1,2-d] imidazole, 1-allyl-5,6-dichlorobenzoimidazole, 1-allyl-5-chlorobenzimidazole, 1-arylimidazole, 1-arylbenzimidazole, 1-aryl-5-chlorobenzimidazole, 1-aryl- 5,6-dichlorobenzimidazole, 1-aryl-5-methoxybenzimidazole, 1-aryl-5-cyanobenzimidazole, 1-arylnaphtho[1,2-d] imidazole; in which the alkyl group in the hereto-ring preferably has from 1 to 8 carbon atoms, for example, an unsubstituted alkyl group such as methyl, ethyl, propyl, isopropyl or butyl, or a hydroxyalkyl group such as 2-hydroxyethyl or 3-hydroxypropyl, and it is especially preferably methyl or ethyl; and the aryl group in the same is a phenyl group, a halogen-substituted phenyl group such as chloro-substituted phenyl, an alkyl-substituted phenyl group such as methyl-substituted phenyl, or an alkoxy-substituted phenyl group such as methoxy-substituted phenyl); pyridine nuclei (e.g., 2-pyridine, 2-pyridine, 5-methyl- 2-pyridine, 3-methyl-4-pyridine), quinoline nuclei (e.g., 2-quinoline, 3-methyl-2-quinoline, 5-ethyl-2-quinoline, 6-methyl-2-quinoline, 6-nitro-2-quinoline, 8-fluoro- 2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro- 4-quinoline, 8-methyl-4-quinoline, 8-methoxy-4-quinoline, isoquinoline, 6-nitro-1-isoquinoline, 3,4-dihydro- 1-isoquinoline, 6-nitro-3-isoquinoline); imidazo[4,5-b]quinoxaline nuclei (e.g., 1,3-diethylimidazo[ 4,5-b]quinoxaline, 6-chloro-1,3-diallylimidazo[ 4,5-b]quinoxaline), benzotellurazole nuclei (e.g., benzotellurazole, 5-methylbenzotellurazole, 5-methoxybenzotellurazole); naphthotellurazole nuclei (e.g., naphtho[1,2-d]tellurazole); oxadiazole nuclei; thiadiazole nuclei; tetrazole nuclei; pyrimidine nuclei.

$Z^3$ has the same meaning as $Z^1$.

The atomic group for forming a 5-membered or 6-membered nitrogen-containing hetero-ring of $Z^1$, $Z^2$ or $Z^3$ may have a substituent(s). Examples of the substituent include a lower alkyl group having 1 to 8 carbon atoms (e.g., methyl, trifluoromethyl, ethyl, propyl, isopropyl, butyl, benzyl, t-amyl, phenethyl), a halogen atom (e.g., F, Cl, Br, I), an aryl group (e.g., phenyl, chlorophenyl, bromophenyl, methylphenyl, methoxyphenyl, furyl, thienyl), an alkoxy group (e.g., methoxy, ethoxy, propoxy, butoxy, benzyloxy, 2-methoxyethoxy, 2-hydroxyethoxy, 2-methoxy-2-methylethoxy), an alkoxycarbonyl group (methoxycarbonyl, ethoxycarbonyl, benzyloxycarbonyl), a cyano group, a nitro group, and a hydroxy group. Among them, a chlorine atom, bromine atom, a methyl group, a methoxy group and a phenyl groupa are preferred, and a chlorine atom, a methyl group and a methoxy group are most preferred.

As the atomic group for forming a 5-membered or 6-membered nitrogen-containing hereto-ring of $Z^1$, $Z^2$ or $Z^3$, the atomic group for completing a substituted or unsubstituted, benzothiazole ring, benzoxazole ring, benzoimidazole ring, naphthoxazole ring, naphthothiazole ring or quinolne ring is prefered, and the atomic group for completing a substituted or unsubstituted, benzothiazole ring, benzoimidazole ring or naphthothiazole ring is most preferered.

$Z^4$ represents an atomic group for forming a 5-membered or 6-membered nitrogen-containing hetero-ring along with (C—CO) in the formula. As examples of the hetero-ring, mentioned are rhodanine nuclei, 2-thiohydantoin nuclei, 2-thioxo-oxazolidin-4-one nuclei 2-pyrazolin-5-one nuclei, barbituric acid nuclei, 2-thiobarbituric acid nuclei, thiazolidine-2,4-dione nuclei, thiazolidin-4-one nuclei, isoxazolone nuclei, hydantoin nuclei, indanedione nuclei. It may also be a structure formed by opening a ring derived from acetylacetone, malondinitrile, ethyl aceracetate, or ethyl cyanoacetate.

The 5-membered or 6-membered ring to be formed by $Z^4$ may be substituted by one or more substituents, for example, chosen from among alkyl groups, substituted alkyl groups, aryl groups, substituted aryl groups and heterocyclic groups. As examples of the substituents, mentioned are an alkyl group having from 1 to 18 carbon atoms (e.g., methyl, ethyl, propyl, isopropyl, butyl, isobutyl, hexyl, octyl, dodecyl, octadecyl), preferably having from 1 to 7 carbon atoms, more preferably having from 1 to 4 carbon atoms; a substituted alkyl group, for example, an aralkyl group (e.g., benzyl, 2-phenylethyl), a hydroxyalkyl group (e.g., 2-hydroxyethyl, 3-hydroxypropyl), a carboxyalkyl group (e.g., 2-carboxyethyl, 3-carboxypropyl, 4-carboxybutyl, carboxymethyl), an alkoxyalkyl group (e.g., 2-methoxyethyl, 2-(2-methoxyethoxy)ethyl), a sulfoalkyl group (e.g., 2-sulfoethyl, 3-sulfopropyl, 3-sulfobutyl, 4-sulfobutyl, 2-(3-sulfopropoxy)ethyl, 2-hydroxy-3-sulfopropyl, 3-Sulfopropoxyethoxyethyl), a sulfatoalkyl group (e.g., 3-sulfatopropyl, 4-sulfatobutyl), a hereto-ring-substituted alkyl group (e.g., 2-(pyrrolidin-2-on-1-yl)ethyl, tetrahydrofurfuryl, 2-morpholinoethyl), 2-acetoxyethyl group, carboxymethoxymethyl group, 2-methanesulfonylaminoethyl group, allyl group; an aryl group (e.g., phenyl, 2-naphthyl); a substituted aryl group (e.g., 4-carboxyphenyl, 4-sulfophenyl, 3-chlorophenyl, 3-methylphenyl); a heterocyclic group (e.g., 2-pyridyl, 2-thiazolyl). Among them, a methyl group, an ethyl group, a carboxymethyl group, a 2-sulfoethyl group, a 2-pyridyl group and a phenyl group are preferred, and an ethyl group, a 2-pyridyl group and a phenyl group are most preferred.

Preferred examples of $Z^4$ is an atomic group for completing a so-called acidic nucleus. Examples of the acidic nucleus include the hetero rings described in Table B on page 199 of *Theory of the Photographic Process*, editted by James, Macmillan, 1977. Most preferred examples of $Z^4$ include an atomic group for completing a rhodanine ring or a hydantoin ring such as —S—CS—NR$^5$—, —NR$^6$—CS—NR$^7$— where R$^5$, R$^6$ and R$^7$ each represent an alkyl group, an aryl group or a heterocyclic group (e.g., methyl, ethyl, phenyl, 2-pyridyl, 2-carboxyethyl, carboxymethyl, 2-sulfoethyl, 2-acetamidoethyl, 2-hydroxyethyl, and the group represented by formula (3) or (4) described above).

$Z^5$ and $Z^6$ are atomic groups for forming a 5-membered or 6-membered nitrogen-containing hetero-ring along with (C—CO) in the formula. The ring is one derived by removing the oxo or thioxo group positioned at a suitable position from a 5-membered or 6-membered ring having two carbonyl and/or thiocarbonyl groups in total which is formed by $Z^4$ and (C—CO).

$Z^5$ and $Z^6$ each preferably represent —O—, —S—, or -NR$^7$- where R$^7$ represents an alkyl group and an aryl group, for example, methyl, ethyl, phenyl, 2-pyridyl, 2-carboxyethyl, carboxymethyl, 2-hydroxyethyl, 2-sulfoethyl, 2-acetamidoethyl, and the group represented by formula (3) or (4). $Z^5$ is more preferably —S— or —NR$^7$— and $Z^6$ is more preferably —O— or —NR$^7$—. The most preferred combination of $Z^5$ and $Z^6$ include the combination where $Z^5$ is —NR$^7$— and $Z^6$ is —O—, and the combination where $Z^5$ is —S— and $Z^6$ is —NR$^7$—.

$L^1$ represents a methine group or a substituted methine group, or a trivalent group to be formed by an odd number of these groups bonded to each other by conjugated double bond (e.g., =CH—CH=CH—, =CH—CH=CH—CH=CH—, and =CH—CH=CH—CH=CH—CH=CH—); and $L^2$ represents a tetravalent group to be formed by an even number of methine groups and/or substituted methine groups bonded to each other by conjugated double bond (e.g., =CH—CH=, =CH—CH=CH—CH=, and =CH—CH=CH—CH=CH—CH=).

As substituents for the methine group, for example, mentioned are an alkyl group (preferably those having 1 to 8 carbon atoms, e.g., methyl, ethyl), an aryl group (preferably those having 6 to 10 carbon atoms, e.g., phenyl), an aralkyl group (preferably those having 7 to 10 carbon atoms, e.g., benzyl), an alkoxy group (preferably those having 1 to 8 carbon atoms, e.g., methoxy, ethoxy), an aryloxy group (preferably those having 6 to 10 carbon atoms, e.g., phenoxy), an alkylthio group (preferably those having 1 to 8 carbon atoms, e.g., methylthio, ethylthio), an arylthio group (preferably those having 6 to 10 carbon atoms, e.g., phenylthio), and a halogen atom (e.g., chlorine, bromine). The substituents on the methine chain may together form a 5-membered to 6-membered ring. Examples of such a 5-membered to 6-membered ring include

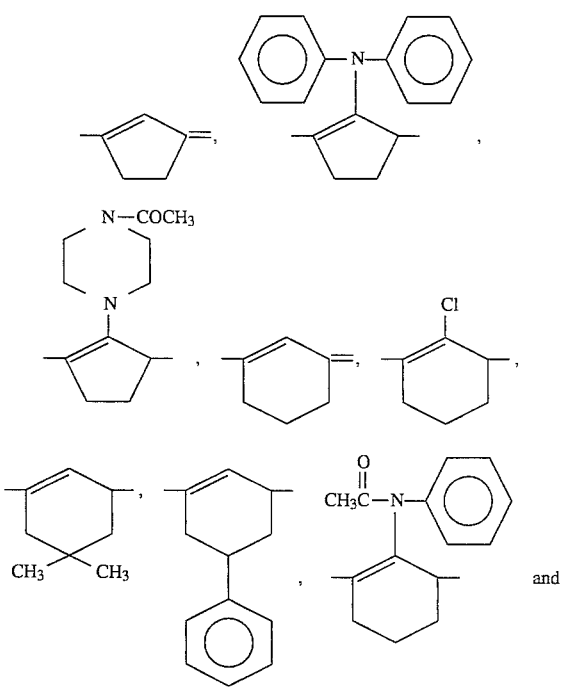

-continued

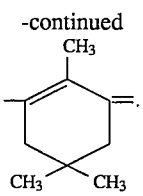

$L^1$ is preferably

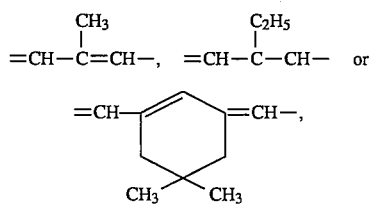

and, $L^2$ is preferably =CH—CH= or =CH—CH=CH—CH=.

$R^1$, $R^2$ and $R^3$ each represent a substituted or unsubstituted alkyl group, for example, those having from 1 to 18, preferably from 1 to 7, especially preferably from 1 to 4, carbon atoms. As examples of the unsubstituted alkyl group, mentioned are methyl, ethyl, propyl, isopropyl, butyl, isobutyl, hexyl, octyl, dodecyl and octadecyl groups. As examples of the substituted alkyl group, mentioned are an aralkyl group (e.g., benzyl, 2-phenylethyl), a hydroxyalkyl group (e.g., 2-hydroxyethyl, 3-hydroxypropyl), a carboxyalkyl group (e.g., 2-carboxyethyl, 3-carboxypropyl, 4-carboxybutyl, carboxymethyl), an alkoxyalkyl group (e.g., 2-methoxyethyl, 2-(2-methoxyethoxy)ethyl), a sulfoalkyl group (e.g., 2-sulfoethyl, 3-sulfopropyl, 3-sulfobutyl, 4-sulfobutyl, 4-sulfo-3-methylbutyl, 2-(3-sulfopropoxy)ethyl, 2-hydroxy-3-sulfopropyl, 3-sulfopropoxyethoxyethyl), a sulfatoalkyl group (e.g., 3-sulfatopropyl, 4-sulfatobutyl), a hetero-ring-substituted alkyl group (e.g., 2-(pyrrolidin-2-on-1-yl)ethyl, tetrahydrofurfuryl), 2-acetoxyethyl group, carboxymethoxymethyl group, 2-methanesulfonylaminoethyl group, an allyl group, $T^1$—$G^1$NH$G^2$ (where $T^1$ is an alkylene group) and —$T^1$—$G^1$N$^-$$G^2$ (where $T^1$ is an alkylene group). They may be linked to an α-methine group to form a ring each.

p represents 0 or 1.

q represents 0 or 1, preferably 0.

$X^-$ represents a counter anion paring up with the quaternary nitrogen cation in the formula. This imparts to the formula a pre-determined number of anionic charges necessary for neutralizing the charge of the quaternary nitrogen cation, and this is not limited to a monovalent anion, and may be divalent or trivalent. As examples of the counter anion, mentioned are halide ions such as $F^-$, $Cl^-$, $Br^-$, $I^-$; sulfate or alkylsulfate ions such as $SO_4^{2-}$, $HSO_4^-$, $CH_3OSO_3^-$; sulfonate ions such as paratoluenesulfonate ion, methanesulfonate ion, trifluoromethanesulfonate ion; carboxylate ions such as acetate ion, trifluoroacetate ion, oxalate ion; $PF_6^-$, $BF_4^-$, $ClO_4^-$, $IO_4^-$, $PO_4^{3-}$, $NO_3^-$; and phenolate ions such as picrate ion.

The divalent linking group to be represented by $T^1$ is preferably an alkylene group, an arylene group, an ether bond, a thioether bond, an ester bond, an amido bond, a sulfonamido bond, or a combination comprising them. It is preferred that $T^1$ has from 0 to 8 carbon atoms in total. Further, an alkylene group having 1 to 4 carbon atoms is preferred, —$CH_2CH_2$— or —$CH_2$— is more preferred, and —$CH_2$— is most preferred.

n is preferably an interger of 1 to 3, more preferably 1 or 2. In formula (2), n is especially preferably 1.

The group of $T^2$ is preferably an alkyl group having 1 to 8 carbon atoms, an aryl group having 6 to 8 carbon atoms, an amino group having 0 to 8 carbon atoms, an alkoxy group having 1 to 8 carbon atoms or an aryloxy group having 6 to 8 carbon atoms, more preferably an alkyl group having 1 to 4 carbon atoms and an aryl group having 6 to 8 carbon atoms, further preferably an alkyl group having 1 to 4 carbon atoms, most preferably a methyl group. $G^1$ is preferably —CO—, and $G^2$ is preferably —$SO_2T^2$.

The dyes of formula (5) is most preferred among the dyes of formulae (5) to (7).

As preferred examples of the combination of G or $G^-$ and DYE, mentioned are those of the following formulae (8) to (17).

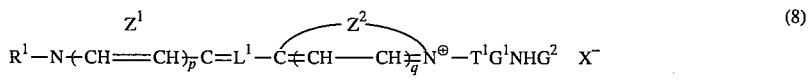

(8)

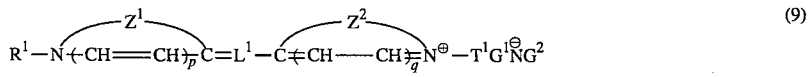

(9)

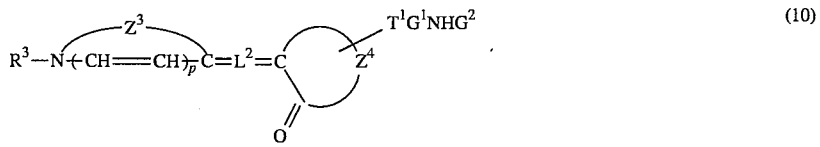

(10)

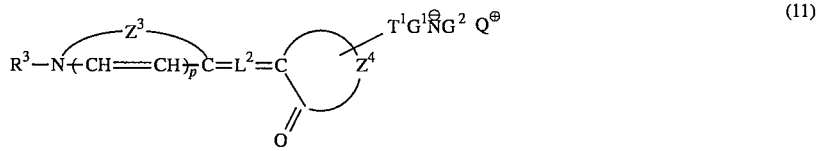

(11)

-continued

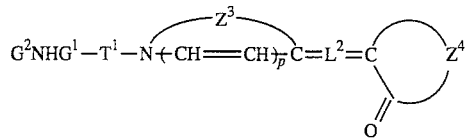 (12)

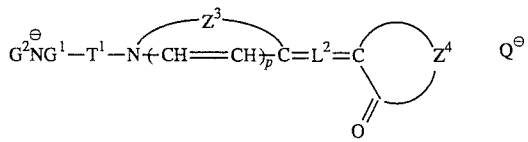 (13)

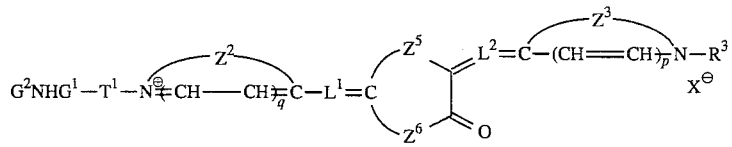 (14)

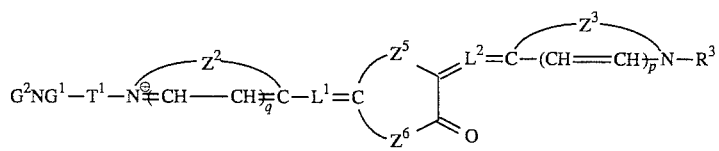 (15)

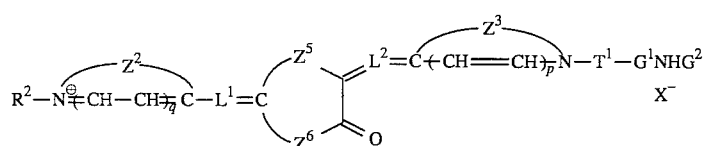 (16)

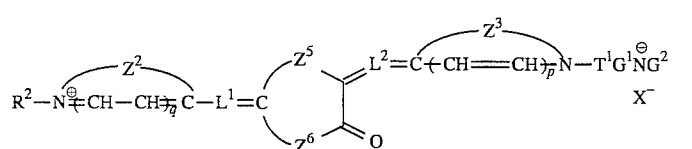 (17)

Among the dyes of formulae (8) to (17), the dyes of forlmulae (9), (11), and (13) are preferred, and those of formula (9) are most preferred.

Of the compounds of formulae (1) and (2), preferred are those of the following formulae (18) and (19). Especially preferred are the compounds of formula (19).

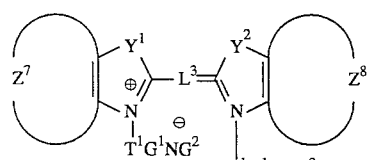 (18)

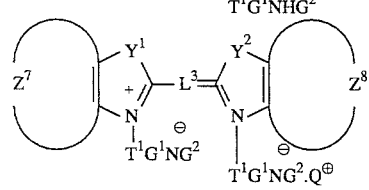 (19)

In these formulae, $T^1$, $G^1$ and $G^2$ have the same meanings as those in formulae (3) and (4); $Y^1$ and $Y^2$ each represent an oxygen atom, a sulfur atom, a selenium atom, —$NR^4$— (where $R^4$ has the same meaning as $R^1$ or $R^2$), or —$CR^5R^6$— (where $R^5$ and $R^6$ each have the same meanings as $R^1$ or $R^2$); $Z^7$ and $Z^8$ each represent an atomic group for completing an optionally substituted benzene or naphthalene ring; $L^3$ represents an optionally substituted methine group or a trivalent group to be formed by 3, 5 or 7 methine groups bonded to each other by conjugated double bond; and Q represents an onium ion for neutralizing the charge of the molecule. $Y^1$ and $Y^2$ each is preferably a sulfur atom. Examples of the onium ion represented by Q include ammonium, immonium, and phosphonium (e.g., ammonium, piperidinium, triethylammonium, tetraethylammonium, tetrabutylammonium, benzyltrimethylammonium, pyridinium, N-ethylpyridinium, 2,3-dimethylbenzothiazolium, 1,3-diethylimidazolium and methyltriphenyl phosphonium).

Examples of the substituent for the benzene ring of $Z^7$ or $Z^8$ include the substituents for $Z^1$ or $Z^2$ described above.

Examples of $L^3$ include

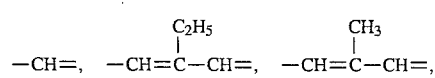

-continued
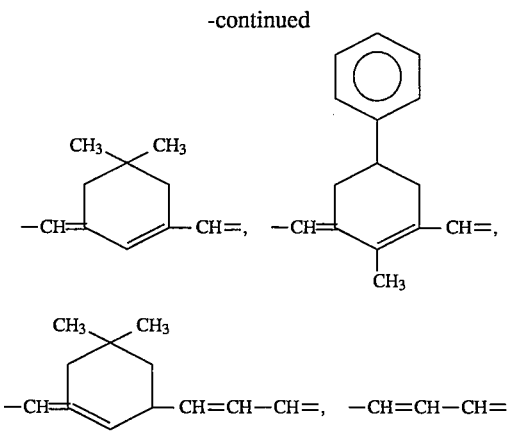
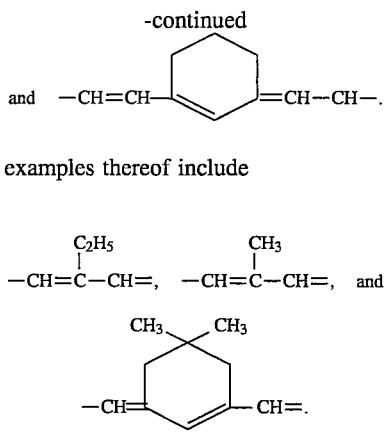
and —CH=CH—⟨cyclohexenyl⟩=CH—CH—.
Preferred examples thereof include
$$-CH=\underset{C_2H_5}{\underset{|}{C}}-CH=,\quad -CH=\underset{CH_3}{\underset{|}{C}}-CH=,\quad \text{and}$$
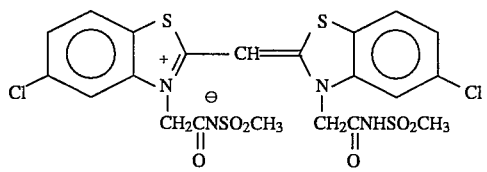
Specific examples of the compounds of formulae (1) and (2) are mentioned below, which, however, are not intended to restrict the scope of the present invention.
I-1
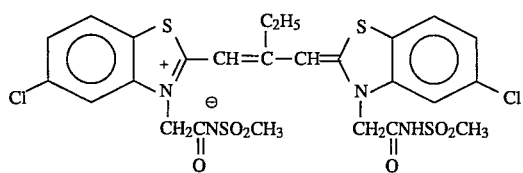
I-2
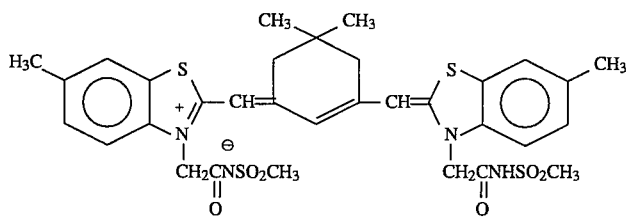
I-3
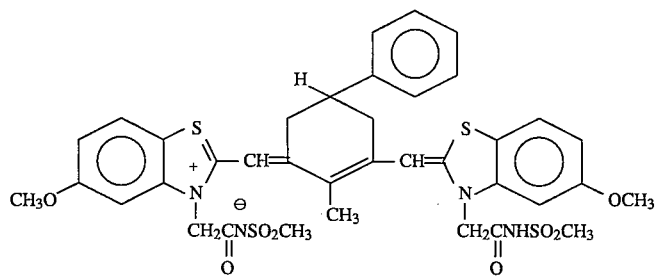
I-4

-continued
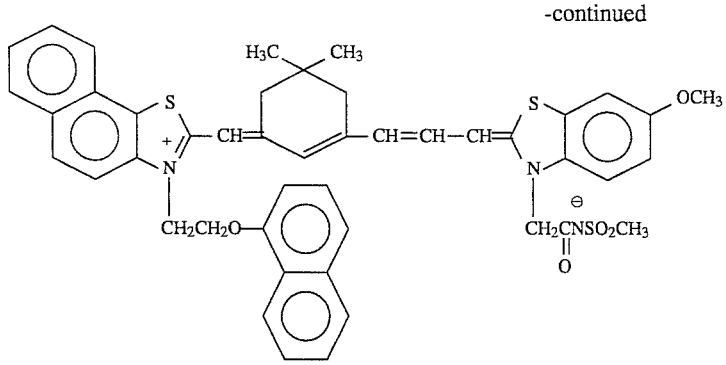
I-5
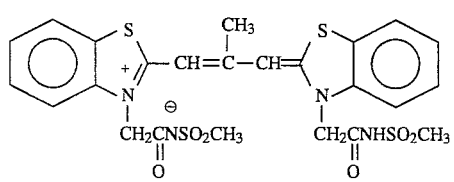
I-6
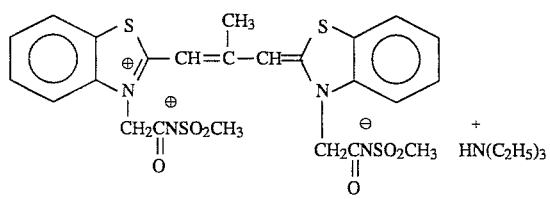
I-7
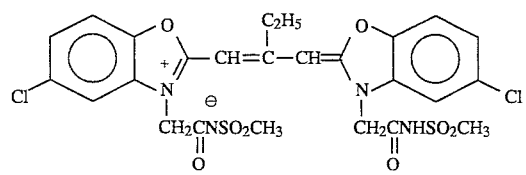
I-8
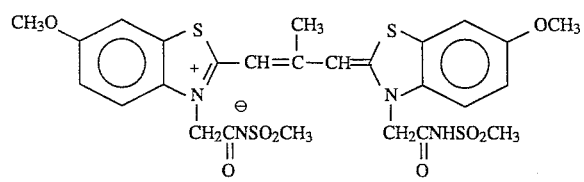
I-9
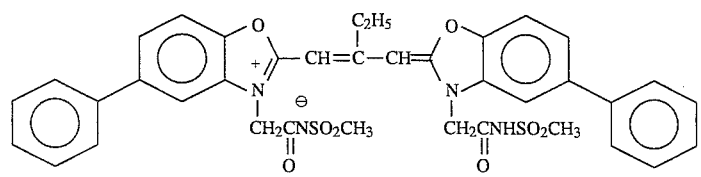
I-10
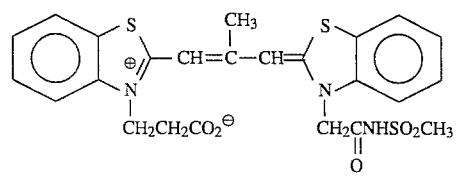
I-11
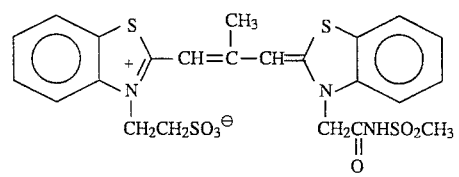
I-12

-continued
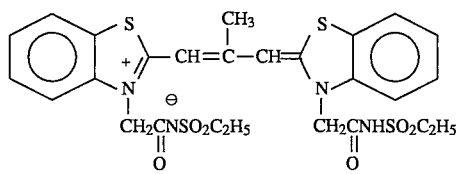 I-13
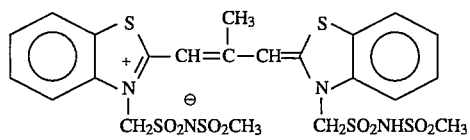 I-14
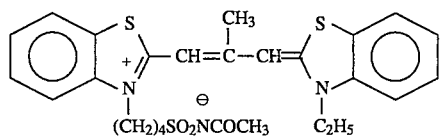 I-15
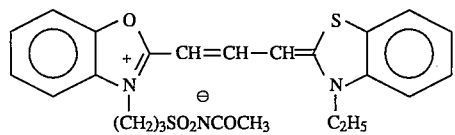 I-16
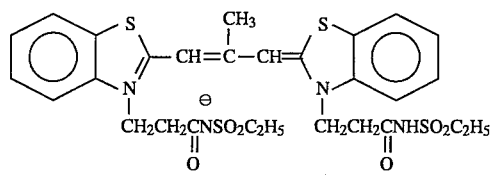 I-17
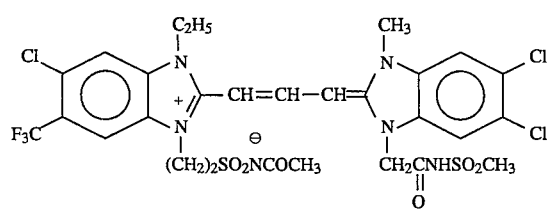 I-18
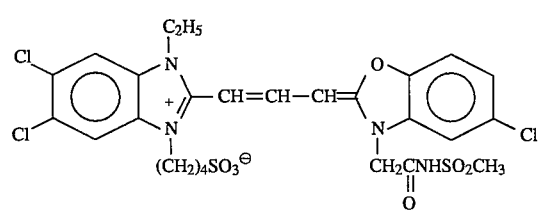 I-19
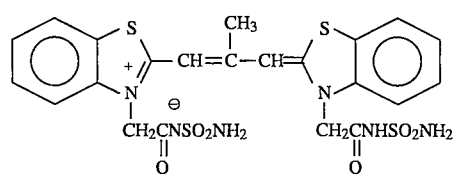 I-20
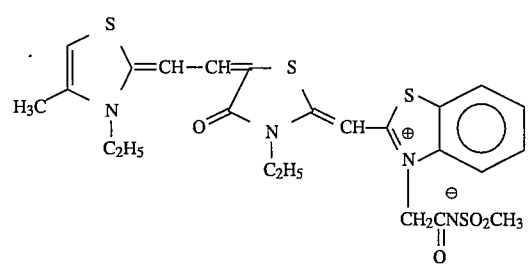 I-21

-continued
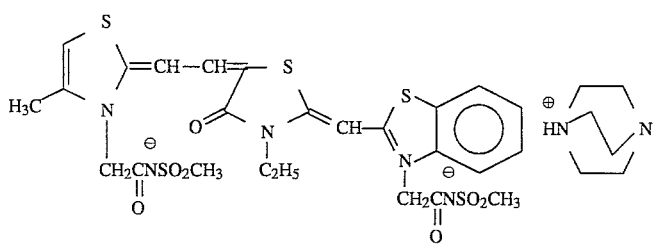
I-22
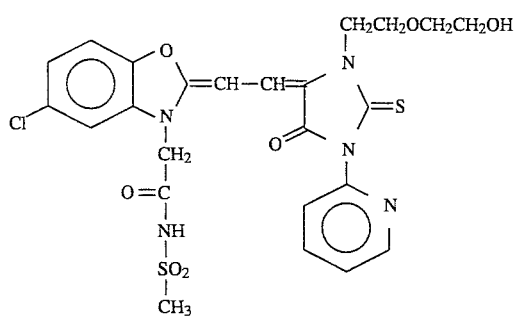
I-23
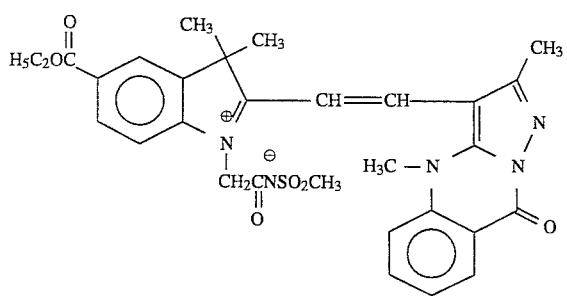
I-24
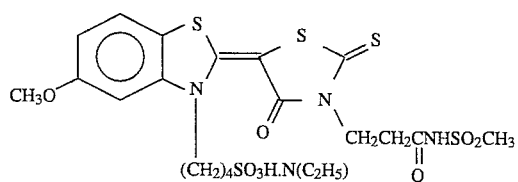
I-25
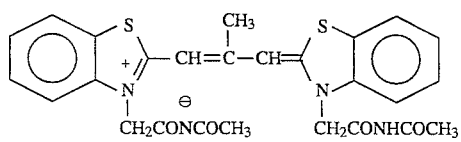
I-26
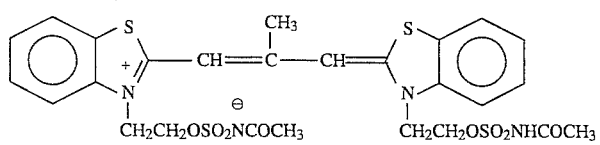
I-27
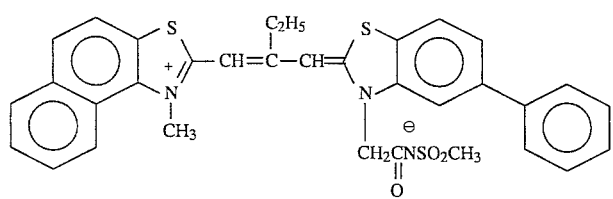
I-28

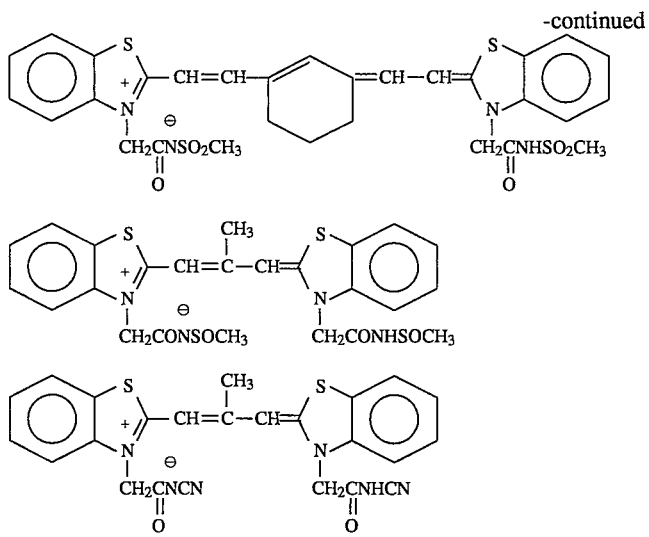

I-29

I-30

I-31

Compound I-6 is most preferred in the present invention.

The compounds of formula (1) or (2) can be easily synthesized by one skilled in the art, for example, by referring to U.S. Pat. No. 3,282,933, F. M. Hamer, *THE CYANINE DYES AND RELATED COMPOUNDS*, (Interscience Publishers, N.Y., 1964), page 55 et seq. , NIKOLAI TYUTYULKOV, JURGEN FABIAN, ACHIN MEHLHORN, FRITZ DIETZ, ALIA TADJER, *POLYMETHINE DYES*, (St. KLIMENT OHRIDSKI UNIVERSITY PRESS, SOPHIA, 1992), pp. 23 to 38, and Research Disclosure, Vol. 152, p. 48 (1976).

SYNTHESIS EXAMPLE 1

Synthesis of Compound I-6

290 g of 3-(N-methanesulfonylcarbamoylmethyl)-2-methylbenzothiazolium bromide is charged into a 3 liter three-necked flask equipped with an agitator, and 238 ml of acetic acid, 830 ml of pyridine, and 593 g of triethyl orthoacetate were added thereto and the mixture was heated to 110° C. in terms of the outer temperature. Then, 118 ml of triethylamine was added thereto, and stirring was conducted for 2 hours at 110° C. The resulting mixture was allowed to stand until it was cooled to room temperature, and further cooled with ice for 1 hour to precipitate crystals. The precipitated crystals were collected by filtration and washed with ethanol. The obtained crude crystals were heated and dissolved in 2 liter of methanol and 55 ml of triethylamine, and the hot solution was filtered to obtain filtrate, and 55 ml of acetic acid was added to the filtrate with stirring, and the mixture was cooled with ice to precipitate crystals. The crystals were collected by filtration and washed with methanol to obtain the desired compound at a yield of 107 g. λmax (methanol) : 544 nm

SYNTHESIS EXAMPLE 2

Synthesis of Compound I-7

10 g of Compound I-6 prepared in Synthesis Example 1 was heated and dissolved in 200 ml of methanol and 5.5 ml of triethylamine. After 200 ml of ethyl acetate was added thereto gradually, the solution was cooled with ice. The precipitated crystals were collected by filtration and washed with ethanol to obtain the desired compound at a yield of 3.6 g. λmax (methanol) : 544 nm The silver halide photographic material of the present invention contains a methine compound of the above-mentioned formula (1) or (2) in at least one (preferably emulsion layer) of the layers constituting the photographic material.

To add the above-mentioned methine compound to silver halide emulsions (often referred to as photographic emulsions), it may directly be dispersed in the emulsion or, alternatively, it is first dissolved in a single solvent such as water, methanol, ethanol, propanol, methyl cellosolve, 2,2, 3,3-tetrafluoropropanol, etc. or a mixed solvent comprising two or more of them and the resulting solution may be added to the emulsion. If desired, it may be formed into an aqueous solution in the presence of an acid or a base, for example, according to JP-B 44-23389, 44-27555 and 57-22089, or may be formed into an aqueous solution or colloidal dispersion in the presence of a surfactant, for example, according to U.S. Pat. Nos. 3,822,135 and 4,006,025, and the resulting solution or dispersion may be added to emulsions. Also if desired, the methine compound is first dissolved in a substantially water-immiscible solvent such as phenoxyethanol, etc. and then dispersed in water or a hydrophilic colloid, and the resulting dispersion may be added to emulsions. Also if desired, the methine compound is directly dispersed in a hydrophilic colloid and the resulting dispersion may be added to emulsions, for example, according to JP-A 53- 102733 and 58-105141.

In the case where the compound of the present invention is used as a dye, it is preferably incorporated in a hydrophilic colloid layer(s) other than the silver halide photographic emulsion layer.

The methine compounds of the present invention and other sensitizing dyes, desensitizing dyes and dyes may be dissolved by means of ultrasonic vibration, for example, according to U.S. Pat. No. 3,485,634. As other means for dissolving or dispersing the compounds of the present invention and other dyes so as to add them to emulsions, employable are those described in U.S. Pat. Nos. 3,482,981, 3,585,195, 3,469,987, 3,425,835, 3,342,605, British Patents 1,271,329, 1,038,029, 1,121,174, U.S. Pat. Nos. 3,660,101, 3,658,546.

The dyes may be added to photographic emulsions in any step in the process of producing the emulsions or may be added thereto in any time after the production of the emulsions and just before coating them on a photographic support. As examples of the former, they are added to photographic emulsions in the step of forming silver halide grains, in the step of physically ripening the grains or in the step of chemically ripening them. For instance, they may be added during formation of silver halide grains according to JP-A 55-26589.

The methine compounds and other sensitizing or desensitizing dyes may be added to silver halide photographic emulsions each generally in an amount of from $5 \times 10^{-9}$ mol to $2 \times 10^{-2}$ mol, preferably from $5 \times 10^{-6}$ mol to $2 \times 10^{-2}$ mol, especially preferably from $1 \times 10^{-5}$ mol to $1 \times 10^{-2}$ mol, per mol of the silver halide in the emulsion.

The silver halide to be in the silver halide photographic emulsions constituting the photographic material of the present invention may be any of silver bromide, silver iodobromide, silver iodochlorobromide, silver chlorobromide and silver chloride. The silver halide grains may have any unlimited crystal phase.

For instance, the silver halide emulsion may contain tabular silver halide grains having a thickness of 0.5 μm or less, preferably 0.3 μm or less, a diameter of preferably 0.6 μm or more, and a mean aspect ratio of 5 or more, in an amount of 50% or more of the total projected area of all silver halide grains in the emulsion. The emulsion may be a mono-dispersed emulsion containing silver halide grains having a grain size falling within the range of the mean grain size ±40% in an amount of 95% or more of the number of all silver halide grains in the emulsion.

The silver halide grains may have different phases in their inside and surface layer or may have a uniform phase. They may be grains which form a latent image essentially on their surface (for example, as negative emulsions) or those which form it essentially in their inside (for example, as internal latent image-forming emulsions or pre-fogged direct reversal emulsions).

The photographic emulsions for use in the present invention may be prepared by known methods, for example, those described in P. Glafkides, *Chimie et Physique Photographique* (published by Paul Montel, 1967), G. F. Duffin, *Photographic Emulsion Chemistry* (published by The Focal Press, 1966) and V. L. Zelikman et al, *Making and Coating Photographic Emulsion* (published by The Focal Press, 1964).

Briefly, the emulsions may be prepared by any of an acid method, a neutral method, ammonia method and the like. For forming the emulsion by reacting a soluble silver salt and soluble halide(s), any of a single jet method and a double jet method or a combination of them may be employed. A so-called reversed jet method of forming silver halide grains in the presence of excess silver ions may also be employed.

As one embodiment of a double jet method, a so-called controlled double jet method of keeping the pAg value in the liquid phase of forming silver halide grains therein may be employed. In accordance with the method, silver halide grains having a regular crystalline form and having nearly uniform grain sizes may be obtained.

Two or more different silver halide emulsions that were formed separately may be mixed for use in the present invention.

To control the growth of silver halide grains during their formation, a silver halide solvent may be added thereto. As usable silver halide solvents, mentioned are, for example, ammonia, potassium rhodanide, ammonium rhodanide, thioether compounds (such as those described in U.S. Pat. Nos. 3,271,157, 3,574,628, 3,704,130, 4,297,439, 4,276,374), thione compounds (such as those described in JP-A 53-144319, 53-82408, 55-77737), amine compounds (such as those described in JP-A 54-100717).

Cadmium salts, zinc salts, thallium salts, iridium salts or their complex salts, rhodium salts or their complex salts, and iron salts or their complex salts may be added to the emulsion during the step of forming silver halide grains or the step of physically ripening them.

As internal latent image-type emulsions employable in the present invention, for example, mentioned are those comprising silver halide grains having therein heterogeneous metals, such as those described in U.S. Pat. Nos. 2,592,250, 3,206,313, 3,447,927, 3,761,276, 3,935,014.

The silver halide emulsions for use in the present invention are, in general, chemically ripened ones. To chemically ripen the emulsions, for example, employable are the methods described in H. Frieser, *Die Grundklagendor Photographischen Prozesse mit Silber Halogeniden* (published by Akademische Verlage Gesellschaft, 1968), pp. 675–734.

Briefly, employable are a sulfur sensitization method using sulfur-containing compounds capable of reacting with active gelatins or silver (e.g., thiosulfates, thioureas, mercapto compounds, rhodanines); a reduction sensitization method using reducing substances (e.g., stannous salts, amines, hydrazine derivatives, formamidinesulfinic acids, silane compounds); a noble metal sensitization method using noble metal compounds (e.g., gold complexes, complexes with metals of the Group VIII in the Periodic Table such as Pt, Rh, Ir, Pd); and a combination of two or more of the methods.

As specific examples of usable chemical sensitizers, mentioned are sulfur sensitizers such as allylthiocarbamide, thiourea, sodium thiosulfate, cystine, etc.; noble metal sensitizers such as potassium chloroaurate, aurous thiosulfate, potassium chloropalladate, etc.; and reduction sensitizers such as tin chloride, phenylhydrazine, reductons, etc.

In addition, selenium sensitizers are also usable.

Selenium sensitizers comprise unstable selenium compounds and/or non-unstable selenium compounds, and these are may be added to emulsions to be sensitized therewith and stirred at a high temperature, preferably at 40° C. or higher, for a determined period of time.

As unstable selenium compounds usable for this purpose, preferred are those mentioned in JP-B 44-15748, 53-13489 and JP-A-4-25832 and 4-109240. As specific examples of suitable unstable selenium sensitizers, mentioned are isoselenocyanates (e.g., aliphatic isoselenocyanates such as allyl isoselenocyanate), selenoureas, selenoketones, selenoamides, selenocarboxylic acids (e.g., 2-selenopropionic acid, 2-selenoacetic acid), selenoesters, diacylselenides (e.g., bis(3-chloro-2,6-dimethoxybenzoyl)selenide), selenophosphates, phosphine selenides and colloidal metal selenium.

Preferred examples and analogues of unstable selenium compounds usable in the present invention are mentioned above, which, however, are not limitative. For those skilled in the art, the structures of unstable selenium compounds as sensitizers for photographic emulsions are not specifically important provided that the selenium in the compounds is unstable. Anyhow, it has generally be understood by them that the organic moiety in the selenium sensitizer molecule does not have any other role than the role of carrying selenium therewith so as to release it in emulsions as an unstable form thereof. In the present invention, any and every unstable selenium compounds of such a broad conceptual range may be employed advantageously.

Non-unstable selenium compounds usable in the present invention for sensitization of the emulsions may be those described in JP-B 46-4553, 52-34492 and 52-34491. As examples of usable non-unstable selenium compounds, mentioned are selenious acid, potassium selenocyanide, selenazoles, quaternary salts of selenazoles, diaryl selenides, diaryl diselenides, dialkyl selenides, dialkyl diselenides, 2-selenazolinedione, 2-selenoxazolidinethione and derivatives thereof.

In addition, the photographic emulsion may contain other sensitizers such as polyoxyethylene compounds, polyoxypropylene compounds, quaternary ammonium group-having compounds, etc.

The above-mentioned photographic emulsion of the present invention may contain various compounds for the purpose of preventing fogging and stabilizing the photographic properties during manufacture, storage or processing of the material. For instance, various compounds known as an antifoggant or stabilizer may be used for the purposes, including azoles such as benzothiazolium salts, nitroimidazoles, triazoles, benzotriazoles, benzimidazoles (especially, nitro- or halogen-substituted ones); heterocyclic mercapto compounds such as mercaptothiazoles, mercaptobenzothiazoles, mercaptobenzimidazoles, mercaptothiadiazoles, mercaptotetrazoles (especially, 1-phenyl-5-mercaptotetrazole), mercaptopyrimidines; heterocyclic mercapto compounds, such as those mentioned above, having water-soluble group(s) such as carboxyl group or sulfone group; thioketo compounds such as oxazolinethione; azaindenes such as tetrazaindenes (especially, 4-hydroxy-substituted (1,3,3a,7)tetrazaindenes); benzenethiosulfonic acids; benzenesulfinic acids, etc.

The silver halide emulsions for use in the present invention may contain a polymer latex comprising a homo- or co-polymer composed of, for example, alkyl acrylates, alkyl methacrylates, acrylic acid, glycidyl acrylate, etc. as described in U.S. Pat. Nos. 3,411,911, 3,411,912, 3,142,568, 3,325,286, 3,547,650, JP-B 45-5331, for the purpose of improving the dimension stability of photographic materials and of improving the film properties of them.

Where the silver halide emulsions are those for a lithographic printing photographic material, they may contain a polyalkylene oxide compound having a function of improving the infectious developability of the emulsions. For instance, usable for the purpose are the compounds described in U.S. Pat. Nos. 2,400,532, 3,294,537, 3,294,540, French Patents 1,491,805, 1,596,673, JP-A 60-156423, 54-18726, 56-161933. As preferred examples of them, mentioned are condensates composed of a polyalkylene oxide comprising at least 10 units of an alkylene oxide having from 2 to 4 carbon atoms such as ethylene oxide, propylene-1,2-oxide, butylene-1,2-oxide, preferably ethylene oxide, and a compound having at least one active hydrogen such as water, aliphatic alcohols, aromatic alcohols, fatty acids, organic amines, hexitol derivatives, etc.; and block copolymers composed of two or more different polyalkylene oxides. As specific examples of usable polyalkylene oxide compounds, mentioned are polyalkylene glycol alkyl ethers, polyalkylene glycol aryl ethers, polyatkylene glycol alkylaryl ethers, polyalkylene glycol esters, polyalkylene glycol aliphatic amides, polyalkylene glycol amines, polyalkylene glycol block copolymers, polyalkylene glycol graft polymers. Such polyalkylene oxide compounds usable in the present invention have a molecular weight of from 300 to 15,000, preferably from 600 to 8,000. The amount of the polyalkylene oxide compound to be added to the emulsions of the present invention is preferably from 10 mg to 3 g per mol of the silver halide in the emulsion. The compound may be added to the emulsions at any time during the process of producing them.

The silver halide photographic emulsions to be used in the present invention may contain color couplers such as cyan couplers, magenta couplers and yellow couplers along with compounds in which the couplers are dispersed.

In other words, the emulsions may contain compounds to color by oxidation coupling with an aromatic primary amine developing agent (e.g., phenylenediamine derivatives, aminophenol derivatives) during color development. For instance, usable magenta couplers are 5-pyrazolone couplers, pyrazolobenzimidazole couplers, cyanoacetylcoumaron couplers, acyclic acylacetonitrile couplers, etc.; usable yellow couplers are acylacetamide couplers (e.g., benzoylacetanilides, pivaloylacetanilides), etc.; and usable cyan couplers are naphthol couplers, phenol couplers, etc. These couplers are preferably non-diffusive ones having a hydrophobic group, a so-called ballast group in the molecule. The couplers may be either 4-valent or 2-valent relative to silver ion. In addition, colored couplers having a color-correcting effect as well as couplers releasing a development inhibitor during development (so-called DIR couplers) may also be used.

Apart from DIR couplers, also usable are non-coloring DIR coupling compounds that give a colorless product by coupling reaction while releasing a development inhibitor.

The silver halide emulsions may contain water-soluble dyes (e.g., oxonole dyes, hemioxonole dyes, merocyanine dyes), as filter dyes or for anti-irradiation or for other various purposes.

The silver halide emulsions may contain various surfactants for various purposes of coating aid, prevention of static charging, improvement of slide property, promotion of emulsification and dispersion, prevention of surface blocking and improvement of photographic characteristics (e.g., promotion of developability, elevation of contrast, elevation of sensitivity).

For instance, usable for these purposes are nonionic surfactants such as saponins (steroid type), alkylene oxide derivatives (e.g., polyethylene glycol), polyethylene glycol alkyl ethers, glycidol derivatives, fatty acid esters of polyhydric alcohols, alkyl esters of saccharides. etc.; anionic surfactants such as alkylcarboxylic acid salts, alkylsulfonic acid salts, alkylbenzenesulfonic acid salts, alkylsulfate esters, etc.; and cationic surfactants such as alkylamine salts, aliphatic or aromatic quaternary ammonium salts, heterocyclic quaternary ammonium salts (e.g., pyridinium or imidazolium salts). Fluorine-containing surfactants are preferred as antistatic agents.

In carrying out the present invention, also usable are known anti-fading agents, such as those mentioned below. Such anti-fading agents are color image stabilizers, and these may be used singly or two or more of them may be used as combined. As usable known anti-fading agents, mentioned are, for example, hydroquinone derivatives, gallic acid derivatives, p-alkoxyphenols, p-oxyphenol derivatives, hisphenol derivatives, etc.

The photographic emulsions may contain organic or inorganic hardening agents. For instance, usable are chromium salts (e.g., chromium alum, chromium acetate), aldehydes (e.g., formaldehyde, glyoxal, glutaraldehyde), active vinyl compounds (e.g., 1,3,4-triacryloyl-hexahydro-s-triazine, 1,3-vinylsulfonyl-2-propanol), active halide compounds (e.g., 2,4-dichloro-6-hydroxy-s-triazine), etc. These may be used singly or as a combination of two or more of them.

The silver halide photographic material of the present invention may contain, as a color-fogging inhibitor, hydroquinone derivatives, aminophenol derivatives, gallic acid derivatives, etc.

The photographic material of the present invention may contain colloidal silvers and dyes for anti-irradiation, anti-halation and especially for separation in of the color sensitivity distribution the light-sensitive layers and for ensuring the safety to safe lights.

As examples of the dyes usable for these purposes, mentioned are oxonole dyes having pyrazolone nuclei, barbituric nuclei or barbituric acid nuclei, such as those described in U.S. Pat. Nos. 506,385, 1,177,429, 1,131,844, 1,338,799, 1,385,371, 1,467,214, 1,438,102, 1,533,516, JP-A 48-85120, 49-114420, 52-117123, 55-161233, 59-111640, 62-273527, JP-B 39-22069, 43-13168, U.S. Pat. Nos. 3,247,127, 3,469,985, 4,078,933; other oxonole dyes such as those described in U.S. Pat. Nos. 2,533,472, 3,379, 533, British Patent 1,278,621, JP-A 1-134447, 1-183652; azo dyes such as those described in British Patents 575,691, 680,631, 599,623, 786,907,907,125, 1,045,609, U.S. Pat. No. 4,255,326, JP-A 59-211043; azomethine dyes such as those described in JP-A 50-100116, 54-118247, British Patents 2,014,598, 750,031; anthraquinone dyes such as those described in U.S. Pat. No. 2,865,752; arylidene dyes such as those described in U.S. Pat. Nos. 2,538,009, 2,668, 541, 2,538,008, British Patents 584,609, 1,210,252, JP-A 50- 40625, 51-3623, 51-10927, 54-118247, JP-B 48-3286, 59- 37303; styryl dyes such as those described in JP-B 28-3082, 44-16594, 59-28898; triarylmethane dyes such as those described in British Patents 446,538, 1,335,422, JP-A 59-288250; merocyanine dyes such as those described in British Patents 1,075,653, 1,153,341, 1,284,730, 1,475,228, 1,542,807; cyanine dyes such as those described in U.S. Pat. Nos. 2,843,486, 3,294,539, JP-A 1-291247. The methine compounds of the present invention may be used advantageously as the above-mentioned dyes, as they are easily decolored.

In order to prevent these dyes from diffusing, employable are the following means. For instance, the dyes are made non-diffusive, by incorporating a ballast group thereinto.

As another means, a hydrophilic polymer that has been charged oppositely to the dissociated anionic dye is added to the photographic layer containing the dye, as a mordant agent, whereby the dye is localized in the particular layer due to the interaction between the polymer and the dye molecule. This is disclosed, for example, in U.S. Pat. Nos. 2,548,564, 4,124,386, 3,625,694.

As still another means, employable is a method of coloring a particular layer with fine grains of a metal salt to which dye molecules have adhered. This is disclosed, for example, in U.S. Pat. Nos. 2,719,088, 2,496,841, 2,496,843, JP-A 60-45237.

As still another means, employable is a method of coloring a particular layer with a water-insoluble solid dye. This is disclosed, for example, in JP-A 56-12639, 55-155350, 55-155351, 63-27838, 63-197943, European Patent 15,601.

The dyes that are dispersible as their fine solid grains are used for the purposes of anti-halation, anti-irradiation, improvement of the safety against safe lights and improvement of the discriminability between the front and back surfaces of the photographic material, and they are incorporated into the silver halide emulsion layers and/or other hydrophilic colloid layers constituting the photographic material. The dyes are needed to satisfy the following conditions:

(1) They have a pertinent spectral absorption in accordance with the use and the object.

(2) They are photochemically inactive. That is to say, they do not have any harmful influences on the chemical properties of silver halide photographic emulsion layers. For example, they do not lower the sensitivity of the emulsion layers, they do not cause fading of latent images, and they do not cause fogging.

(3) They are decolored or dissolved out in the step of photographic processing or rinsing so that they do not cause residual color on the processed photographic materials.

(4) They do not diffuse from the layer dyed with them to any other layers.

(5) They have an excellent time-dependent storage stability in solutions or in photographic materials and are neither discolored nor faded during storage.

As dyes that satisfy these conditions, usable are solid dye dispersions such as those described in JP-A 56- 12639, 55-155350, 55-155351, 63-27838, 63-197943, European Patents 15,601, 274,723, 276,566, 299,435, International Patent WO88/04794, JP-A-2-264936 and 4-14035.

Specific examples of solid dyes which are usable in the present invention are mentioned below.

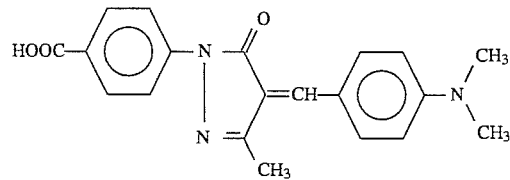

S-1

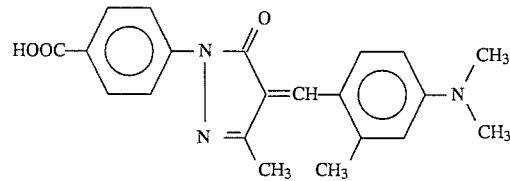

S-2

-continued
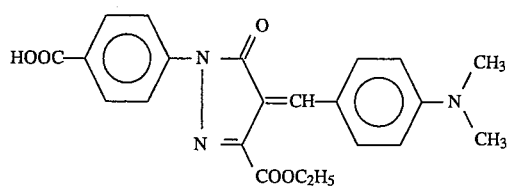 S-3
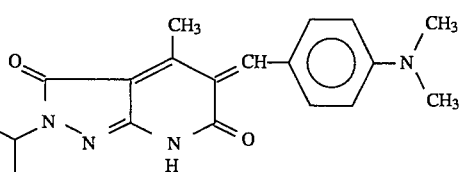 S-4
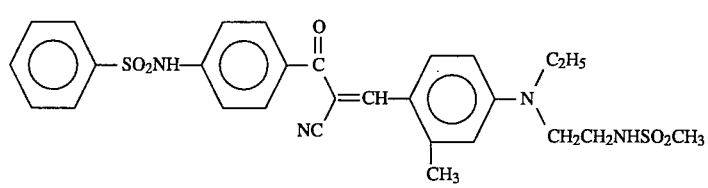 S-5
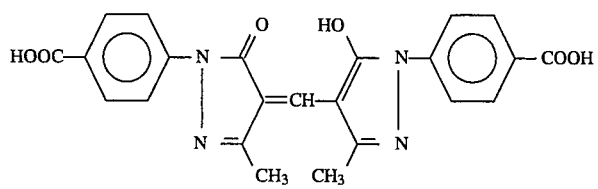 S-6
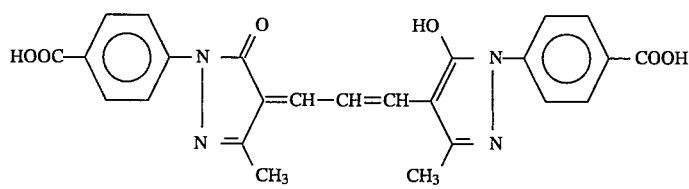 S-7
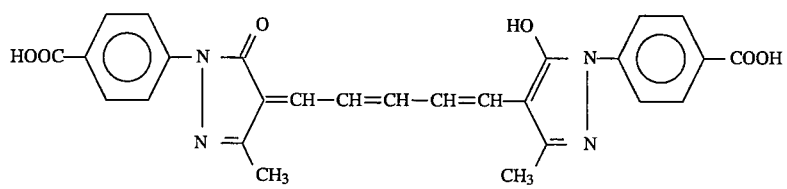 S-8
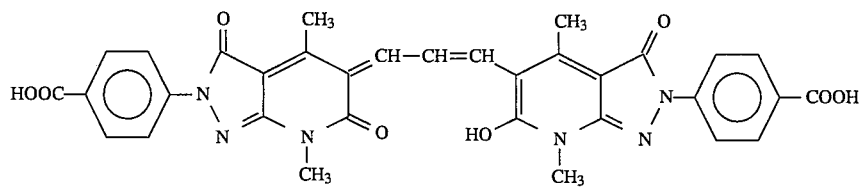 S-9
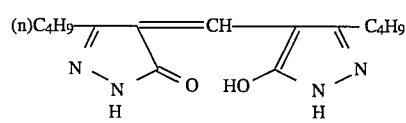 S-10
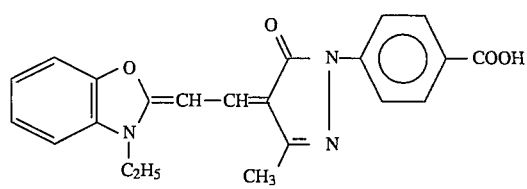 S-11

-continued

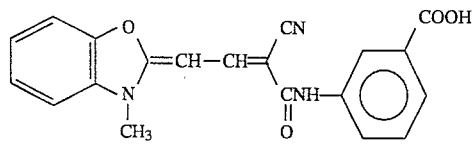
S-12

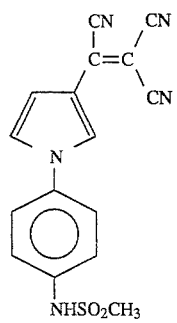
S-13

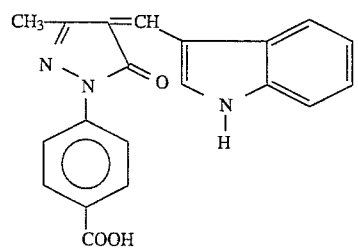
S-14

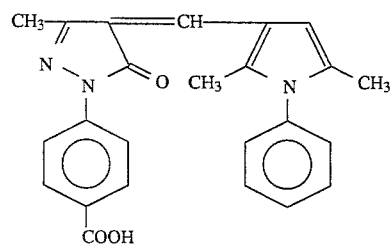
S-15

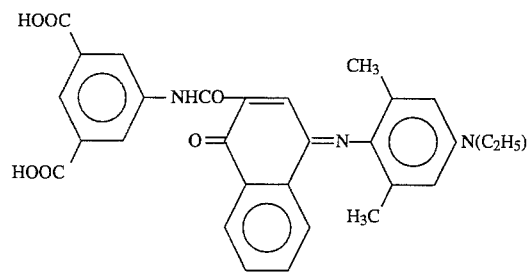
S-16

Such dyes may be produced easily by or in accordance with the methods described in International Patent WO88/04794, European Patents EP 0274723A1, 276,566, 299,435, JP-A 52-92716, 55-155350, 55-155351, 61-205934, 48-68623, U.S. Pat. Nos. 2,527,583, 3,486,897, 3,746,539, 3,933,798, 4,130,429, 4,040,841, JP-A-2-282244, 3-167546, and Japanese Patent Application No. 1-50874.

Since the dyes which are to be in the form of a dispersion of their fine solid grains in the photographic material of the present invention have a low solubility of themselves, they cannot be in the form of their molecules in the colored layer but are therein in the form of their solid grains that are substantially not diffusible in the layer.

Methods for producing such a dispersion are described in, for example, International Patent WO88/04794, European Patent EP 0276566A1, JP-A 63-197943. As a general means, the dyes are milled in a ball mill and are stabilized with surfactants and gelatin.

The dye which is used in the form of a dispersion of fine solid grains generally have a mean grain size of from 0.1 μm to 0.6 μm and a fluctuation coefficient relative to the grain size distribution of 50% or less. The mean grain size of the fine solid dye grains is preferably from 0.1 to 0.5 μm. It is more preferably from 0.1 to 0.5 μm while the dispersion of the grains has a fluctuation coefficient of 35% or less.

The fluctuation coefficient is represented by S/d where S is a standard deviation and d is a mean diameter, relative to the distribution of the solid dye grains that are represented in terms of the diameter of the circle having the same area as that of the projected area of each grain.

The total amount of the dye to be incorporated into the photographic material of the present invention in the form of a dispersion of fine solid grains is preferably from 5 mg/m$^2$ to 300 mg/m², especially preferably from 10 mg/m² to 150 mg/m².

Where the solid dye dispersion is used as a filter dye or anti-halation dye in the photographic material of the present invention, any effective amount thereof may be incorporated into the material. However, it is preferred that the optical density of the layer containing the dye is from 0.05 to 3.5. Addition of the dye dispersion may be effected at any stage before the coating of the emulsion containing it onto a photographic support.

It is desired that the photographic material of the present invention has a protective layer over the above-mentioned emulsion layer coated on a support. The back surface of the support (not coated with the emulsion layer) may be coated with a backing layer. The silver halide photographic material of the present invention may have a constitution composed of backing layer(s), a support, anti-halation layer(s), emulsion layer(s), interlayer(s), ultraviolet absorbing layer(s) and protective layer(s). Where these layers are desired to contain dyes or colors, the methine compounds of the present invention are preferably added thereto as they are easily decolored.

The silver halide photographic emulsion of the present invention may contain, as a protective colloid, gelatin, acylated gelatins such as phthalated gelatin or malonated gelatin, cellulose compounds such as hydroxyethyl cellulose or carboxymethyl cellulose, soluble starches such as dextrin, and hydrophilic polymers such as polyvinyl alcohol, polyvinyl pyrrolidone, polyacrylamide, polystyrenesulfonic acid, a plasticizer for improving the dimension stability, a latex polymer, and a mat agent. The finished emulsion is coated on a suitable support, such as baryta paper, resin-coated paper, synthetic paper, triacetate film, polyethylene terephthalate film, films of other plastics, glass sheet, etc.

The photographic material of the present invention may be exposed by any ordinary method for forming a photographic image thereon. To expose the material, usable are various known light sources, such as natural light (sun light ), tungsten lamps, mercury lamps, xenon arc lamps, carbon arc lamps, xenon flash lamp, lasers, LED, CRT, etc. The time for exposure may be not only from 1/1000 second to one second for ordinary cameras but also a shorter period of time than 1/1000 second, for example from $1/10^4$ to $1/10^8$ second, using a xenon fluorescent lamp or a longer period of time than one second. If desired, the spectral composition of the light to be used for exposure may be controlled, using a color filter. Laser rays may be used for exposure. In addition, also usable for exposure are lights to be emitted from fluorescent substances excited by electron rays, X rays, γ rays or α rays.

The methine compounds of formulae (1 ) and (2 ) of the present invention may be used for sensitization of silver halide photographic emulsions of various color photographic materials and black-and-white photographic materials. Emulsions capable of being sensitized with these compounds are, for example, color positive emulsions, emulsions for color papers, color negative emulsions, emulsions for color reversal films (containing or not containing couplers ), emulsions for photographic materials for photomechanical process (e.g., lithographic films), emulsions for photographic materials for cathode ray displays, emulsions for photographic materials for silver salt diffusion transfer process, emulsions for photographic materials for color diffusion transfer process, emulsions for photographic materials for die transfer process (e.g., imbibition transfer process described in U.S. Pat. No. 2,882,156), emulsions for photographic materials for silver dye bleaching process, emulsions for photographic materials for recording printed-out images (such as those described in U.S. Pat. No. 2,369,449), emulsions for photographic materials for direct print image process (such as those described in U.S. Pat. No. 3,033,682), emulsions for heat-developing color photographic materials, etc.

For processing the photographic material of the present invention, any known methods such as those described in Research Disclosure, No. 176, pp. 28–30 (RD-17643) may be employed, using any known processing solutions. The temperature for processing the material is is generally in the range from 18° C. to 50° C., but may be lower temperatures than 18° C. or higher temperatures than 50° C. According to the object, the material may be processed either by development for forming silver images (black-and-white development) or by color development for forming color images.

The black-and-white developer employable for processing the photographic material of the present invention may contain one or more known developing agents such as dihydroxybenzenes (e.g., hydroquinone), 3-pyrazolidones (e.g., 1-phenyl-3-pyrazolidone), aminophenols (e.g., N-methyl-p-aminophenol), etc.

The color developer employable for processing the photographic material of the present invention is generally an aqueous alkaline solution containing a color developing agent. The color developing agent may be any known primary aromatic amine developing agent, including, for example, phenylenediamines (e.g., 4-amino-N-diethylaniline, 3-methyl-4-amino-N,N-diethylaniline, 4-amino-N-ethyl-N-β -hydroxyethylaniline, 3-methyl-4-amino-N-ethyl-N-β -hydroxyethylaniline, 3-methyl-4-amino-N-ethyl-N-β -methanesulfonamidoethylaniline, 4-amino-3-methyl-N-ethyl-N-β -methoxyethylaniline).

In addition to these, also usable are the compounds described in F. A. Mason, *Photographic Processing Chemistry* (published by the Focal Press, 1966), pp. 226–229, U.S. Pat. Nos. 2,193,015, 2,592,364, JP-A 48-64933.

The developer may contain, in addition to the above-mentioned developing agent, a pH buffer such as alkali metal sulfites, carbonates, borates and phosphates; and a development inhibitor or antifoggant such as bromides or organic antifoggants. If desired, it may also contain a water softener; a preservative such as hydroxylamine; an organic solvent such as benzyl alcohol, diethylene glycol; a development accelerator such as polyethylene glycol, quaternary ammonium salts, amines; a color-forming coupler; a competing coupler; a foggant such as sodium boronhydride; an auxiliary developing agent such as 1-phenyl-3-pyrazolidone; a tackifier; a polycarboxylic acid type chelating agent such as those described in U.S. Pat. No. 4,083,723; an antioxidant such as those described in German Patent Publication (OLS) 2,622,950.

After color development , the developed photographic material is generally bleached. The bleaching may be effected simultaneously with or separately from fixation of the material. As the bleaching agent, for example, usable are compounds of polyvalent metals such as Fe (III), Co(III), Cr(IV) or Cu(II), as well as peracids, quinones, nitroso compounds, etc. As examples of the compounds, mentioned are ferricyanides; bichromates; organic complexes with Fe(III) or Co(III), for example, Fe(III) or Co(III) complexes with aminopolycarboxylic acids such as ethylenediaminetetraacetic acid, nitrilotriacetic acid, 1,3-diamino-2-propanol-tetraacetic acid, or with organic acids such as citric acid, tartaric acid, malic acid; persulfates, permanganates; nitrosophenol, etc. Of these, potassium ferricyanide, sodium ethylenediaminetetraacetato/Fe(III) and ammonium ethylenediaminetetraacetato/Fe(III) are especially useful. Ethylenediaminetetraacetato/Fe(III) complexes are useful either in an independent bleaching solution or in a mono-bath blix solution.

The bleaching solution or blix solution may contain a bleaching accelerator such as those described in U.S. Pat. Nos. 3,042,520, 3,241,966, JP-B 45-8506, 45-8836, a thiol compound such as those described in JP-A 53-65732, and other various additives. After bleached or blixed, the processed photographic material may be rinsed or may be treated in a stabilization bath without being rinsed.

Various additives usable for producing the photographic material of the present invention and the processing methods applicable to the material are not specifically defined. For instance, disclosures of the following references are referred to.

| | References |
|---|---|
| 1) Silver halide emulsions and methods of preparing them | JP-A 2-97937, from page 20, right bottom column, line 12 to page 21, left bottom column, line 14; JP-A 2-12236, from page 7, right top column, line 19 to page 8, left bottom column, line 12; selenium sensitization method described in JP-A-5-11389 |
| 2) Spectral sensitizing dyes (usable singly or as mixtures) | JP-A 2-55349, from page 7, left top column, line 8 to page 8, right bottom column, line 8; JP-A 2-39042, from page 7, right bottom column, line 8 to page 13, right bottom column, line 5 JP-A 2-12236, page 8, from left bottom column, line 13 to right bottom column, line 4; JP-A 2-103536, from page 16, right bottom column, line 3 to page 17, left bottom column, line 20; JP-A 1-112235, 2-124560, 3-7928, 5-11389; Japanese Patent Application No. 3-411064 |
| 3) Hydrazine nucleating agents | JP-A 2-12236, from page 2, right top column, line 19 to page 7, right top column, line 3; JP-A 3-174143, from page 20, right bottom column, line 1 to page 27, right top column, line 20 (general formula (II) and Compounds (II-1) to (II-54)) |
| 4) Nucleation Accelerators | JP-A 2-103536, from page 9, right top column, line 13 to page 16, left top column, line 10 (general formulae (II-m) to (II-p) and Compounds (II-1) to (II-22)); JP-A 1-179939 |
| 5) Surfactants | JP-A 2-12236, page 9, from right top column, line 7 to right bottom column, line 7; JP-A 2-18542, from page 2, left bottom column, line 13 to page 4, right bottom column, line 18 |
| 6) Antifoggants | JP-A 2-103536, from page 17, right bottom column, line 19 to page 18, right top column, line 4, and page 18, right bottom column, lines 1 to 5; Thiosulfinic acid compounds in JP-A 1-237538 |
| 7) Polymer latexes | JP-A 2-103536, page 18, left bottom column, lines 12 to 20 |
| 8) Mat agents, Lubricants, Plasticizers | JP-A 2-103536, page 19, from left top column, line 15 to right top column, line 15 |
| 9) Poly-hydroxybenzenes | JP-A 2-55349, page 11, from left top column, line 9 to right bottom column, line 17 |
| 10) Compounds with acid group | JP-A 103536, from page 18, right bottom column, line 6 to page 19, left top column, line 1; JP-A 2-55349, from page 8, right bottom column, line 13 to page 11, left top column, line 8 |
| 11) Dyes | JP-A 2-103536, page 17, right bottom column, lines 1 to 18; JP-A 2-39042, from page 4, right top column, line 1 to page 6, right top column, line 5 |
| 12) Binders | JP-A 2-18542, page 3, right bottom column, lines 1 to 20 |
| 13) Black pepper inhibitors | U.S. Pat. No. 4,956,257; JP-A 1-118832 |
| 14) Redox compounds | JP-A 2-301743 (general formula (I), especially Compound Nos. 1 to 50); JP-A 3-174143, pp. 3 to 20 (general formulae (R-1), (R-2), (R-3), Compound Nos. 1 to 75); Japanese Patent Application Nos. 3-69466, 3-15648 |
| 15) Monomethine compounds | JP-A 2-287532 (general formula (II), especially Compounds (II-1) to (II-26)) |
| 16) Dihydroxybenzenes | JP-A 3-39948, from page 11, left top column to page 12, left bottom column; EP 452772A2 |
| 17) Developers and developing methods | JP-A 2-103536, from page 19, right top column, line 16 to page 21, left top column, line 8; JP-A 2-55349, from page 13, right bottom column, line 1 to page 16, left top column, line 10 |

The present invention will be explained in more detail by means of the following examples, which, however, are not intended to restrict the scope of the present invention.

EXAMPLE 1

Solution 2 and Solution 3 shown in Table 1 below were added to Solution 1 also shown in Table 1, all the solutions having been kept at 38° C. and at pH of 4.5, by a double jet method over a period of 24 minutes, while stirring, to form grains of 0.18 µm. Next, Solution 4 and Solution 5 shown in Table 1 were added thereto over a period of 8 minutes and then 0.15 g of potassium iodide were added thereto. Thus, the formation of grains was finished.

The grains thus formed were then washed with water by ordinary flocculation, gelatin was added thereto, and the pH of the system and the pAg thereof were adjusted at 5.2 and 7.5, respectively. Next, 4 mg of sodium thiosulfate, 2 mg of N,N-dimethylselenourea, 10 mg of chloroauric acid, 4 mg of sodium benzenetiosulfonate and 1 mg of sodium benzenethiosulfinate were added thereto, and the emulsion was thus chemically sensitized at 55° C. to have the optimum sensitivity.

50 mg of 2-methyl-4-hydroxy-1,3,3a,7-tetrazaindene as a stabilize, and 100 ppm of phenoxyethanol as an antiseptic were added thereto. Finally, an emulsion of cubic silver iodochlorobromide grains having a silver chloride content of 80 mol% and a mean grain size of 0.20 µm was obtained. This is referred to as Emulsion A. This had a fluctuation coefficient of 9%.

TABLE 1

| Solution 1 | Water | 1.0 liter |
|---|---|---|
| | Gelatin | 20 g |

TABLE 1-continued

|  |  |  |
|---|---|---|
|  | Sodium Chloride | 2 g |
|  | 1,3-Dimethylimidazolidine-2-thione | 20 mg |
|  | Sodium Benzenethiosulfonate | 6 mg |
| Solution 2 | Water | 600 ml |
|  | Silver Nitrate | 150 g |
| Solution 3 | Water | 600 ml |
|  | Sodium Chloride | 45 g |
|  | Potassium Bromide | 21 g |
|  | Potassium Hexachloroiridate(III) (0.001% aqueous solution) | 15 ml |
|  | Ammonium Hexabromorhodate(III) (0.001% aqueous solution) | 1.5 ml |
| Solution 4 | Water | 200 ml |
|  | Silver Nitrate | 50 g |
| Solution 5 | Water | 200 ml |
|  | Sodium Chloride | 15 g |
|  | Potassium Bromide | 7 g |
|  | $K_4Fe(CN)_6$ | 30 mg |

Formation of Coated Samples:

The sensitizing dye as indicated in Table 2 below was added to Emulsion A, and 300 mg, per mol of silver, of disodium 4,4'-bis(4,6-dinaphthoxy-pyrimidin-2-ylamino)stilbenedisulfonate and 450 mg, per mol of silver, of 2,5-dimethyl-3-allyl-benzothiazole iodide were added thereto so as to supersensitize and stabilize the emulsion.

TABLE 2

| Sample No. | Sensitizing Dye Kind | Amount Coated (mol/mol of Ag) | Sensitivity (relative value) | Residual Color | Remarks |
|---|---|---|---|---|---|
| 1 | — | — | 10 | 5 | comparative sample |
| 2 | Dye-1(*) | $5 \times 10^{-4}$ | 100 | 2 | comparative sample |
| 3 | Dye-1(*) | $1 \times 10^{-4}$ | 70 | 3 | comparative sample |
| 4 | Dye-2(**) | $5 \times 10^{-4}$ | 50 | 4 | comparative sample |
| 5 | Dye-2(**) | $1 \times 10^{-3}$ | 80 | 3 | comparative sample |
| 6 | I-6 | $5 \times 10^{-4}$ | 100 | 5 | sample of the invention |
| 7 | I-6 | $1 \times 10^{-3}$ | 120 | 5 | sample of the invention |
| 8 | I-7 | $5 \times 10^{-4}$ | 100 | 5 | sample of the invention |
| 9 | I-9 | $5 \times 10^{-4}$ | 110 | 5 | sample of the invention |
| 10 | I-12 | $5 \times 10^{-4}$ | 80 | 5 | sample of the invention |
| 11 | I-14 | $5 \times 10^{-4}$ | 100 | 5 | sample of the invention |
| 12 | I-15 | $5 \times 10^{-4}$ | 100 | 4 | sample of the invention |
| 13 | I-17 | $5 \times 10^{-4}$ | 100 | 4 | sample of the invention |
| 14 | I-20 | $5 \times 10^{-4}$ | 80 | 5 | sample of the invention |
| 15 | I-27 | $5 \times 10^{-4}$ | 100 | 4 | sample of the invention |

Dye-1(*1):

Dye-2(**): (structures shown)

In addition, polyethyl acrylate latex was added to the emulsion in an amount of 25%, relative to the gelatin binder in the emulsion layer, colloidal silica was added thereto in an amount of 30%, relative to the gelatin binder in the same, and 2-bis(vinylsulfonylacetamido)ethane as a hardening agent was added thereto in an amount of 80 mg/m². The resulting emulsion was coated on a polyester support in an amount of 3.0 g/m² as silver therein. Over the emulsion layer, an upper protective layer and a lower protective layer, each having the composition shown in Tables 3-1 and 3-2 below, were coated at the same time.

TABLE 3-1

| Upper Protective Layer | Amount Coated, per m² |
|---|---|
| Gelatin |  |
| Silica Mat Agent (mean grain size, 2.5 μm) | 50 mg |
| Silicone Oil | 100 mg |
| Colloidal Silica (mean grain size, 10 μm) | 30 mg |
| Compounds 1) and 2)(*) mentioned below | 5 mg each |
| Sodium Dodecylbenzenesulfonate | 22 mg |

TABLE 3-2

| Lower Protective Layer | Amount Coated, per m² |
|---|---|
| Gelatin |  |
| Compound 3)(*) mentioned below | 5 mg |
| Sodium Benzenethiosulfonate | 2 mg |
| 1,5-dihydroxy-2-benzaldoxime | 25 mg |
| 5-Chloro-8-hydroxyquinoline | 5 mg |
| Polyethyl Acrylate Latex | 160 mg |

*1) $C_8F_{17}SO_2N(C_3H_7)-CH_2COOK$
*2) $C_8F_{17}SO_3K$

TABLE 3-2-continued
| Lower Protective Layer | Amount Coated, per m² |
|---|---|
| *3) 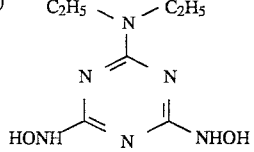 | |
The support had a backing layer and a backing layer-protecting layer each having the composition mentioned below.
| Backing Layer: | |
|---|---|
| Gelatin | 2.0 g/m² |
| Sodium Dodecylbenzenesulfonate | 80 mg/m² |
| Dye ① | 100 mg/m² |
| Dye ② | 100 mg/m² |
| Dye ③ | 100 mg/m² |
| Dye ④ | 100 mg/m² |
| 1,3-Divinylsulfone-2-propanol | 60 mg/m² |
Dye ①: 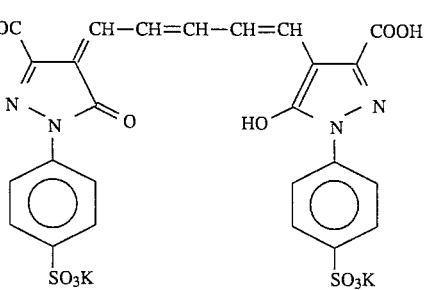
Dye ②: 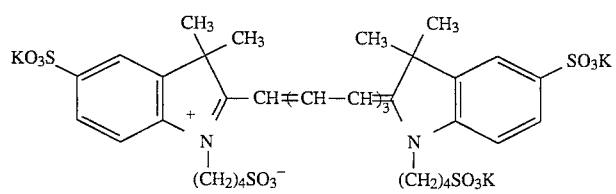
Dye ③: 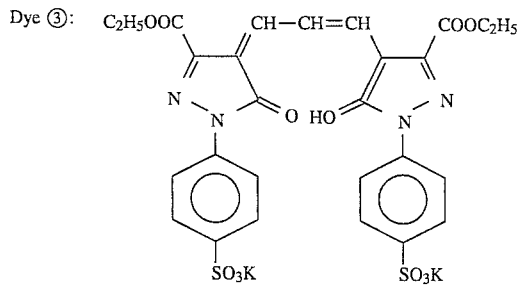

-continued

Dye ④:

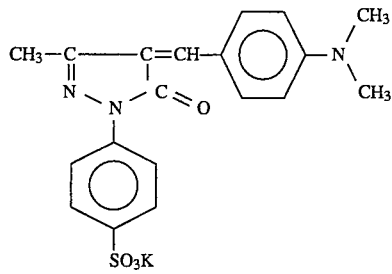

Backing Layer-protecting Layer:

| | |
|---|---|
| Gelatin | 0.5 g/m² |
| Polymethyl Methacrylate (grain size, 4.7 μm) | 50 mg/m² |
| Sodium Dodecylbenzenesulfonate | 20 mg/m² |
| Compound ⑤ | 2 mg/m² |
| Compound ⑥ | 1 mg/m² |
| Silicone Oil | 100 mg/m² |

Compound ⑤

$C_8F_{17}SO_2N(C_3H_7)$—$CH_2COOK$

Compound ⑥

$C_8F_{17}SO_3K$

Evaluation of Samples:

1) Sensitivity:

Each of Sample Nos. 1 to 15 shown in Table 2 above was exposed to a tungsten lamp (1000 luxes) having a color temperature of 2856° K. for 1/5 seconds through a continuous wedge.

The exposed samples were sensitometrically processed, using an automatic processor, FG-710NH Model (made by Fuji Photo Film Co.). The temperature and the time for each step are mentioned below.

| | | |
|---|---|---|
| Development | 38° C. | 14 sec |
| Fixation | 37° C. | 9.7 sec |
| Rinsing | 30° C. | 9 sec |
| Squeezing | | 2.4 sec |
| Drying | 55° C. | 8.3 sec |
| Total | | 43.4 sec |

The developer and the fixer used in the process each had the composition mentioned in the following Tables 4 and 5, respectively.

TABLE 4

| | (i) Amount (g/liter) | (ii) Amount (g/liter) |
|---|---|---|
| KOH | 24 | 24 |
| K₂SO₃ | 70 | 70 |
| Hydroquinone | 35 | 10 |
| Boric Acid | 10 | 10 |
| Diethylene Glycol | 12 | 12 |
| KBr | 5 | 5 |
| Compound a) mentioned below | 2.5 | 2.5 |
| Compound b) mentioned below | 0.3 | 0.3 |
| 4-Hydroxymethyl-4-methyl-1-phenyl-3-pyrazolidone | 2.5 | 2.5 |
| 5-Methylbenzotriazole | 0.1 | 0.1 |
| 2-Mercaptobenzimidazole-5-sulfonic Acid | 0.3 | 0.3 |
| pH | 10.5 | 10.0 |

TABLE 4-continued

| | (i) Amount (g/liter) | (ii) Amount (g/liter) |
|---|---|---|

Compound a):

$$H_2O_3P-\underset{\underset{OH}{|}}{\overset{\overset{CH_3}{|}}{C}}=PO_3H_2$$

Compound b):

[structure of compound b]

TABLE 5

| | Amount (g/liter) |
|---|---|
| Ammonium Thiosulfate | 150 |
| Compound c) mentioned below | 20 |
| Sodium Bisulfite | 30 |
| Disodium Ethylenediaminetetraacetate Dihydrate | 0.025 |
| pH | 6.0 |

Compound c):

[structure of compound c]

As the replenishers to the developer bath and the fixer bath, those of the above-mentioned Tables 4 and 5 were used. The amounts of the replenishers to the bathes each were 150 cc/m². The sensitivity of each sample was shown in Table 2 above, as a relative value to the sensitivity (100) of Sample No. 2. The sensitivity indicates a logarithmic number of the reciprocal of the amount of exposure to give a density of 3.0.

2) Residual Color:

Sample Nos. 1 to 15 in Table 2 above were processed, without being exposed, under the same conditions using the same processing solutions (developer and fixer) as those employed in the above-mentioned sensitometry process 1), except that the temperatures for fixation and rising were lowered to 10° C.

For evaluating the processed samples, they were put on a white paper and checked with the naked eye as to whether or not they had residual color. The samples were evaluated by 5-rank evaluation. "5" means that the sample was colorless; "4" and "3" mean that the sample had some residual color; and "2" and "1" mean that the sample had many residual color. The acceptable level is 4 or more. As is noted from the results shown in Table 2 above, the sensitizing dyes of the present invention gave no or few residual color in the processed samples, while having relatively high sensitizability.

EXAMPLE 2

An electroconductive layer and a protective layer each having the composition mentioned below were coated in this order on one surface of a 125 μ-thick polyethylene terephthalate support, of which the both surfaces had been coated with a subbing layer.

| (1) Electroconductive Layer: | |
|---|---|
| Julymer ET410 (polyacrylate, made by Nippon Pure Chemicals Co.) | 38 mg/m² |
| SnO₂/Sb (9/1, by weight; mean grain size, 0.25 μm) | 216 mg/m² |
| Compound-1 | 5 mg/m² |
| Compound-2 | 5 mg/m² |
| (2) Protective Layer: | |
| Chemipearl S120 (aqueous dispersion of polyolefin, made by Mitsui Petrochemical Industries, Ltd.) | 33 mg/m² |
| Snowtex C (made by Nissan Chemical Industries, Ltd.) | 17 mg/m² |
| Compound-1 | 5 mg/m² |
| Compound-3 | 5 mg/m² |
| Sodium Polystyrenesulfonate | 2 mg/m² |

Compound-1:

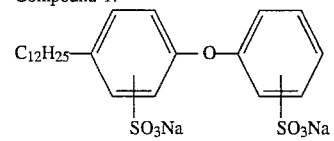

Compound-2:

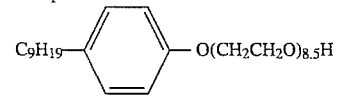

Compound-3:

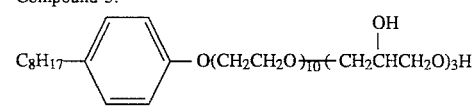

On the other surface of the support, simultaneously coated were a dye-containing layer, an emulsion layer and a protective layer each having the composition mentioned below.

| (3) Colored Layer: | |
|---|---|
| Gelatin | 1.5 g/m² |
| Dispersion of Fine Solid Grains of Dyes(*) | See Table 6 |
| Compound-4 | 8 mg/m² |
| Compound-5 | 40 mg/m² |
| Sodium Polystyrenesulfonate | 25 mg/m² |
| Sodium Dodecylbenzenesulfonate | 15 mg/m² |
| Phosphoric Acid | 15 mg/m² |

Compound-4:

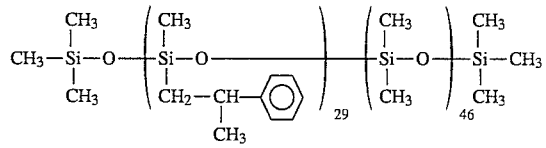

Compound-5:

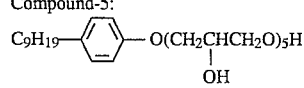

(*)Preparation of dispersion of fine solid grains of dyes:

The method described in JP-A 63-197943 was referred to. Precisely, 434 ml of water and 53 g of a 6.7% solution of Triton X-200R (TX-200R, surfactant sold by Rohm & Haas Co.) were put in a 1.5-liter bottle to be capped with a screw cap. 20 g of solid dyes (see Table 6) and 800 ml of zirconium (ZrO₂) beads (diameter: 2 mm) were added thereto. The bottle was capped tightly and put in a mill, and the content in the bottle was milled for 4 days.

The thus-milled content was added to 160 g of an aqueous 12.5% gelatin solution and put in a roll mill for 10 minutes where the foams decreased. The thus-obtained mixture was filtered and the ZrO₂ beads were removed therefrom. The milled grains had a mean grain size of 0.3 m but still contained rough grains as they were. These were then fractionated by centrifugation to isolate fine grains having a maximum grain size of 1 μm or less.

(4) Emulsion Layer:

Preparation of Emulsion:

Solution A mentioned below was heated at 65° C. and stirred, to which Solution B and Solution C, both mentioned below, were added by a double jet method over a period of 5 minutes. Afterwards, the mixture was kept at 65° C. for 7 minutes, whereby it was physically ripened. Next, Solution D and Solution E, both mentioned below, were added thereto by a controlled double jet method over a period of 40 minutes, while the pAg in the system was controlled at 7.2. Accordingly, monodispersed cubic silver iodobromide grains were obtained, having a mean grain size of 0.26 μm, a silver iodide content of 1 mol% and a fluctuation coefficient of 10%.

| Solution A: | |
|---|---|
| Gelatin | 20 g |
| Potassium Bromide | 3 g |
| Benzenethiosulfonic Acid | 5 mg |

| | |
|---|---|
| 1,3-Dimethylimidazolidine-2-thione | 6 mg |
| Water to make | 900 ml |
| Solution B: | |
| Silver Nitrate | 18.9 g |
| Water to make | 85 ml |
| Solution C: | |
| Potassium Bromide | 13.9 g |
| Water to make | 60 ml |
| Solution D: | |
| Silver Nitrate | 151 g |
| Water to make | 680 ml |
| Solution E: | |
| Potassium Bromide | 106 g |
| Potassium Iodide | 1.5 g |
| Water to make | 455 ml |

Next, the grains were washed by ordinary flocculation, 41 g of gelatin were added thereto, and the resulting emulsion was adjusted to have pH of 6.8 and pAg of 8.9.

The emulsion was further emulsified and dispersed at 35° C., and the dye shown in Table 6 below was added thereto, the amount of the sensitizing dye to be added being shown in Table 6. After the addition, this was heated up to 65° C. over a period of 15 minutes. 14 mg, per mol of silver, of sodium thiosulfate, 4 mg, per mol of silver, of N,N-dimethylselenourea, 5 mg, per mol of silver, of chloroauric acid and 7 mg, per mol of silver, of benzenethiosulfonic acid were added thereto, and this was then chemically sensitized therewith for 60 minutes. Next, 100 mg of 4-hydroxy-6-methyl-1,3,3a,7-tetrazaindene as a stabilizer and 100 mg of phenoxyethanol as an antiseptic were added thereto.

In addition, 15 mg, per mol of Ag, of 1-phenyl-5-mercaptotetrazole, 100 mg, per mol of Ag, of sodium 3-(5-mercaptotetrazole)-benzenesulfonate, 1.5 g, per mol of Ag, of 4-hydroxy-6-methyl-1,3,3a,7-tetrazaindene, 700 mg, per mol of Ag, of potassium bromide, and 150 mg, per mol of Ag, of Compound-6 were added to the emulsion.

Compound-6:

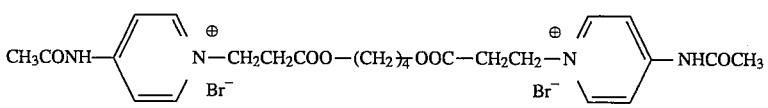

Next, 20 mg, per gram of gelatin, of sodium polystyrenesulfonate was added to the emulsion as a thickener, and the emulsion was adjusted to have pH of 5.2 by adding phosphoric acid thereto. In addition, 30% by weight, relative to gelatin, of polyethyl acrylate latex (mean grain size: 0.05 μm) was added thereto as a plasticizer, and 2-bis(vinylsulfonylacetamido)ethane was added thereto as a hardening agent. The emulsion was coated on the support in an amount of 1.4 g/m² as Ag. The amount of gelatin coated was 1.3 g/m² and that of the hardening agent coated was 100 mg/m².

| (5) Protective Layer: | |
|---|---|
| Gelatin | 0.5 g/m² |
| Fine Grains of Polymethyl Methacrylate (mean grain size: 0.9 μm) | 25 mg/m² |
| Compound-7 (dispersion in gelatin) | 40 mg/m² |
| Compound-8 | 8 mg/m² |
| Sodium Dodecylbenzenesulfonate | 5 mg/m² |
| Colloidal Silica (Snowtex C, made by Nissan Chemical Co.) | 88 mg/m² |
| Compound-9 | 5 mg/m² |
| L-ascorbic Acid | 10 mg/m² |
| 1,5-Dihydroxy-2-benzaldoxime | 5 mg/m² |
| Sodium Acetate | 100 mg/m² |
| Sodium Polystyrenesulfonate | 15 mg/m² |

Compound-7:

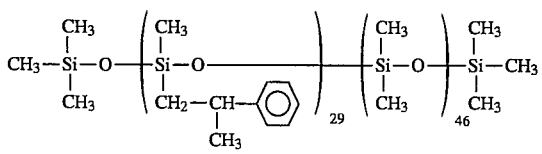

Compound-8:

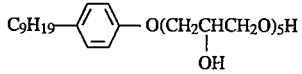

Compound-9:

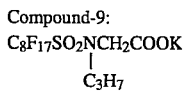

Formation of Coated Samples:

The above-mentioned dye-containing layer, emulsion layer and protective layer were simultaneously coated on the support in this order, and Sample Nos. 1 to 31 shown in Table 6 were obtained. Sample Nos. 23 to 31 contained a dispersion of solid dyes S-8 and S-10, while Sample Nos. 1 to 22 did not.

TABLE 6

| Sample No. | Sensitizing Dye | | Characteristics | | | Remarks |
|---|---|---|---|---|---|---|
| | Kind | Amount Coated (mol/mol of Ag) | Sensitivity (relative value) | Residual Color | after Forced Aging ($\Delta\log E$) | |
| 1 | — | — | 40 | 5 | +0.02 | comparative sample |
| 2 | Dye-1(*) | $6 \times 10^{-4}$ | 130 | 2 | +0.02 | comparative sample |
| 3 | Dye-1(*) | $3 \times 10^{-4}$ | 90 | 3 | +0.02 | comparative sample |
| 4 | Dye-2(**) | $6 \times 10^{-4}$ | 90 | 4 | +0.02 | comparative sample |
| 5 | Dye-2(**) | $1.2 \times 10^{-3}$ | 100 | 3 | +0.04 | comparative sample |
| 6 | I-6 | $6 \times 10^{-4}$ | 130 | 5 | +0.10 | sample of the invention |
| 7 | I-6 | $1.2 \times 10^{-3}$ | 150 | 5 | +0.10 | sample of the invention |
| 8 | I-7 | $6 \times 10^{-4}$ | 135 | 5 | +0.09 | sample of the invention |
| 9 | I-7 | $1.2 \times 10^{-3}$ | 150 | 5 | +0.10 | sample of the invention |
| 10 | I-9 | $6 \times 10^{-4}$ | 130 | 5 | +0.12 | sample of the invention |
| 11 | I-9 | $1.2 \times 10^{-3}$ | 145 | 5 | +0.10 | sample of the invention |
| 12 | I-11 | $6 \times 10^{-4}$ | 120 | 5 | +0.08 | sample of the invention |
| 13 | I-11 | $1.2 \times 10^{-3}$ | 130 | 4 | +0.10 | sample of the invention |
| 14 | I-12 | $6 \times 10^{-4}$ | 120 | 4 | +0.12 | sample of the invention |
| 15 | I-13 | $6 \times 10^{-4}$ | 120 | 5 | +0.08 | sample of the invention |
| 16 | I-13 | $1.2 \times 10^{-3}$ | 130 | 4 | +0.10 | sample of the invention |
| 17 | I-14 | $6 \times 10^{-4}$ | 130 | 5 | +0.09 | sample of the invention |
| 18 | I-17 | $6 \times 10^{-4}$ | 130 | 4 | +0.12 | sample of the invention |
| 19 | I-20 | $6 \times 10^{-4}$ | 120 | 5 | +0.10 | sample of the invention |
| 20 | I-26 | $6 \times 10^{-4}$ | 130 | 4 | +0.10 | sample of the invention |
| 21 | I-26 | $3 \times 10^{-4}$ | 120 | 4.5 | +0.08 | sample of the invention |
| 22 | I-27 | $6 \times 10^{-4}$ | 135 | 4 | +0.12 | sample of the invention |

| Sample No. | Sensitizing Dye | | Dispersion of Solid Dyes | | Characteristics | | | Remarks |
|---|---|---|---|---|---|---|---|---|
| | Kind | Amount Coated (mol/mol of Ag) | Kind | Amounts Coated (mg/m$^2$) | Sensitivity (relative value) | Residual Color | after Forced Aging ($\Delta\log E$) | |
| 23 | — | — | S-8 | 80 | 8 | 5 | +0.04 | comparative sample |
| | | | S-10 | 20 | | | | |
| 24 | Dye-1(*) | $6 \times 10^{-4}$ | S-8 | 80 | 100 | 2 | ±0 | comparative sample |
| | | | S-10 | 20 | | | | |
| 25 | Dye-1(*) | $3 \times 10^{-4}$ | S-8 | 80 | 65 | 3 | +0.03 | comparative sample |
| | | | S-10 | 20 | | | | |
| 26 | Dye-2(**) | $6 \times 10^{-4}$ | S-8 | 80 | 60 | 4 | +0.03 | comparative sample |
| | | | S-10 | 20 | | | | |
| 27 | Dye-2(**) | $1.2 \times 10^{-3}$ | S-8 | 80 | 70 | 3 | +0.05 | comparative sample |
| | | | S-10 | 20 | | | | |
| 28 | I-6 | $6 \times 10^{-4}$ | S-8 | 80 | 100 | 5 | +0.04 | sample of the invention |
| | | | S-10 | 20 | | | | |
| 29 | I-6 | $1.2 \times 10^{-3}$ | S-8 | 80 | 115 | 5 | +0.03 | sample of the invention |
| | | | S-10 | 20 | | | | |
| 30 | I-7 | $6 \times 10^{-4}$ | S-8 | 80 | 105 | 5 | +0.04 | sample of the invention |
| | | | S-10 | 20 | | | | |
| 31 | I-7 | $1.2 \times 10^{-3}$ | S-8 | 80 | 120 | 5 | +0.03 | sample of the invention |
| | | | S-10 | 20 | | | | |

Evaluation of Samples:

1) Sensitivity:

The samples each were exposed to a tungsten lamp (1000 luxes) having a color temperature of 2856° K. for 1/5 seconds through a continuous wedge.

The exposed samples were processed, using an automatic processor, Prostar II Processor (made by Eastman Kodak Co.). The processing speed was 3 m/min.

Prostar Developer (38° C.) and Prostar Fixer (both made by Eastman Kodak Co.) were used. The amount of the replenisher to each bath was 100 cc/m².

The sensitivity of each sample was shown in Table 6 above, as a relative value to the sensitivity (100) of Sample No. 24. The sensitivity indicates a logarithmic number of the reciprocal of the amount of exposure to give a density of 1.0.

2) Residual Color:

The samples in Table 6 above were processed, without being exposed, under the same conditions as those employed in the above-mentioned sensitometry process 1). Three processed films of the same sample were piled on a white paper and checked with the naked eye as to whether or not they had residual color. The samples were evaluated by the same 5-rank evaluation as that in Example 1.

3) Variation in Characteristics after Forced Aging:

The samples were put in a ventilated container that had been shielded from light and stored therein for 5 days at 50° C. (thermal treatment). The thus-aged samples were then exposed and processed. These were compared with the non-aged samples with respect to the sensitivity. The difference in the sensitivity between the aged sample and the non-aged sample was represented by Δlog E. It is presumed that the samples having a smaller value of Δlog E have a higher time-dependent stability.

As is noted from the results shown in Table 6 above, the sensitizing dyes of the present invention gave no or few residual color in the processed samples, while having relatively high sensitizability. In addition, it is also noted therefrom that the anti-aging property of the samples was improved by the addition of the dispersion of fine grains of solid dyes to the AH layer (colored layer) while the dispersion added did neither lower the sensitivity nor increase the residual color.

As has been explained in detail in the above, the methine compounds of the present invention are useful as spectrally-sensitizing dyes to be added to silver halide photographic materials.

The methine compounds highly sensitize silver halide photographic materials, while they do not cause residual color in the processed materials. In addition, even after aged under forced aging conditions, the spectral sensitizability of the compounds is not lowered. In particular, it is preferred to add a dispersion of fine grains of solid dyes to the color layer of the photographic material containing the methine compound of the present invention as the Spectrally-sensitizing dye. The photographic material containing both the dispersion of solid dyes and the methine compound of the present invention has a high sensitivity, while it has few residual color after processed.

While the invention has been described in detail and with reference to specific embodiments thereof, it will be apparent to one skilled in the art that various changes and modifications can be made therein without departing from the spirit and scope thereof.

What is claimed is:

1. A silver halide photographic material having at least one silver halide emulsion layer and a layer containing a dispersion of fine solid grains of a dye or dyes, wherein the photographic material comprises at least one compound represented by formula (18) or (19):

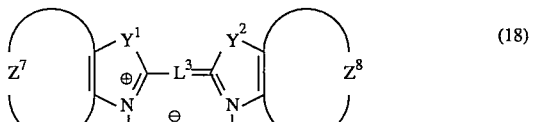

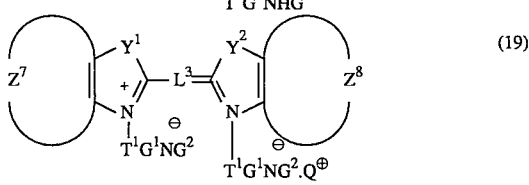

wherein $T^1$ represents $-CH_2-CH_2-$ or $-CH_2-$;

$G^1$ represents a carbonyl group, a sulfinyl group, or a sulfonyl group; $G^2$ represents $-CO-T^2$, $-SO-T^2$, $-SO_2-T^2$, or a cyano group; $T^2$ represents $CH_3$, $C_2H_5$, or $NH_2$; $Y^1$ and $Y^2$ each represent an oxygen atom, a sulfur atom, a selenium atom, $-NR^4-$ where $R^4$ represents an alkyl group having 1 to 4 carbon atoms, or $-CR^5R^6-$ where $R^5$ and $R^6$ each represent an alkyl group having 1 to 4 carbon atoms, and wherein $R^4$, $R^5$ and $R^6$ may each be substituted by a hydroxy group, a carboxy group, a methoxy group, a sulfo group, a sulfato group, an acetoxy group, or a carboxymethoxy group; $Z^7$ and $Z^8$ each represent an atomic group for completing a benzene ring or a naphthalene ring, wherein the benzene ring and naphthalene ring may each be substituted by a chlorine atom, a methyl group, or a methoxy group; $L^3$ represents $$-CH=\overset{C_2H_5}{\underset{|}{C}}-CH=, \quad -CH=\overset{CH_3}{\underset{|}{C}}-CH=, \quad \text{or}$$

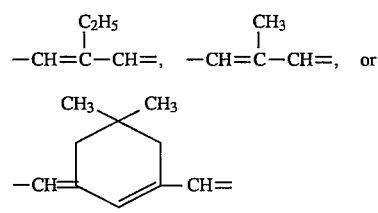

and Q represents an onium ion for neutralizing the charge of the molecule.

2. The silver halide photographic material as claimed in claim 1, wherein the compound of formula (18) is incorporated in the at least one silver halide emulsion layer.

3. The silver halide photographic material as claimed in claim 2, wherein the amount of the compound of formula (18) incorporated in the silver halide emulsion layer is from $5\times10^{-9}$ to $2\times10^{-2}$ mole per mole of the silver halide.

4. The silver halide photographic material as claimed in claim 1, wherein the compound of formula (19) is present and is incorporated in the at least one silver halide emulsion layer.

5. The silver halide photographic material as claimed in claim 4, wherein the amount of the compound of formula (19) incorporated in the silver halide emulsion layer is from $5\times10^{-9}$ to $2\times10^{-2}$ mole per mole of the silver halide.

* * * * *